US012678934B2

(12) United States Patent
Samlali et al.

(10) Patent No.: US 12,678,934 B2
(45) Date of Patent: Jul. 14, 2026

(54) ARTIFICIAL MUSCLE, EXOSKELETON, RELATED METHOD AND SYSTEM

(71) Applicant: ExoVibe, Dilsen-Stokkem (BE)

(72) Inventors: Gabriel Samlali, Dilsen-Stokkem (BE); William Thenaers, Heers (BE); Luc Thomas, Peer (BE); Yoeri Renders, Halen (BE); Jöry Pauwels, Mol (BE)

(73) Assignee: EXOVIBE, Dilsen-Stokkenm (BE)

( * ) Notice: Subject to any disclaimer, the term of this patent is extended or adjusted under 35 U.S.C. 154(b) by 1076 days.

(21) Appl. No.: 17/773,883

(22) PCT Filed: Nov. 4, 2020

(86) PCT No.: PCT/EP2020/080916
§ 371 (c)(1),
(2) Date: May 3, 2022

(87) PCT Pub. No.: WO2021/089594
PCT Pub. Date: May 14, 2021

(65) Prior Publication Data
US 2022/0410369 A1 Dec. 29, 2022

(30) Foreign Application Priority Data

Nov. 4, 2019 (BE) .................................... 2019/5762

(51) Int. Cl.
*B25J 9/00* (2006.01)
*A61H 3/00* (2006.01)
(Continued)

(52) U.S. Cl.
CPC .............. *B25J 9/0006* (2013.01); *A61H 3/00* (2013.01); *B25J 9/1075* (2013.01); *F15B 15/103* (2013.01); *A61H 2003/007* (2013.01)

(58) Field of Classification Search
CPC . B25J 9/0006; B25J 9/142; B25J 9/144; B25J 9/14; B25J 9/1075; F15B 15/10; F15B 15/103
See application file for complete search history.

(56) References Cited

U.S. PATENT DOCUMENTS 5,021,064 A 6/1991 Caines
9,827,667 B2 11/2017 Griffith
(Continued)

FOREIGN PATENT DOCUMENTS

CN 105411813 A 3/2016
CN 107468487 A 12/2017
(Continued)

OTHER PUBLICATIONS

Machine Translation of WO 2018168817 A1. Accessed from PE2E Search tool on May 2025. (Published: Sep. 20, 2018) (Year: 2018).*
(Continued)

*Primary Examiner* — Joseph D. Boecker
*Assistant Examiner* — Jaeick Jang
(74) *Attorney, Agent, or Firm* — Cermak & McGowan LLP; Malcolm K. McGowan

(57) ABSTRACT

Described herein are artificial muscles for soft exoskeletons. Each muscle comprises first and second tendons with attachment means for connecting to the exoskeleton's muscle connectors. A deformable muscle core, preferably enclosed in an outer sleeve, extends between the tendons. Each tendon receives a respective end of the muscle core, with the first tendon featuring an actuation interface for connecting to an actuator. When actuated, the muscle core changes length, causing the tendons to move toward each other as actuation increases and away from each other as actuation decreases. This mechanism enables the artificial muscle to replicate natural muscle contraction and extension, providing force
(Continued)

and movement assistance to soft exoskeleton wearers through a flexible, adaptable design.

33 Claims, 10 Drawing Sheets

(51) Int. Cl.
  *B25J 9/10* (2006.01)
  *F15B 15/10* (2006.01)

(56) References Cited

U.S. PATENT DOCUMENTS

| | | | |
|---|---|---|---|
| 2015/0173993 A1* | 6/2015 | Walsh | A61H 3/00 |
| | | | 414/4 |
| 2018/0056104 A1* | 3/2018 | Cromie | A61H 3/00 |
| 2018/0098907 A1 | 4/2018 | Aguirre-Ollinger | |

FOREIGN PATENT DOCUMENTS

| | | | | |
|---|---|---|---|---|
| CN | 108938340 A | 12/2018 | | |
| EP | 3346142 A1 | 7/2018 | | |
| KR | 20180099128 A | * 9/2018 | | B25J 9/0006 |
| WO | WO-2007058327 A1 | * 5/2007 | | A61F 2/74 |
| WO | JP2018168817 A1 | 11/2019 | | |

OTHER PUBLICATIONS

Machine Translation of WO-2007058327-A1. Accessed from PE2E Search tool on Sep. 2025. (Year: 2007).*
Machine Translation of KR-20180099128-A. Accessed from PE2E Search tool on Sep. 2025. (Year: 2018).*
Wehner, Michael et al., "A Lightweight Soft Exosuit for Gait Assistance", 2013 IEEE International Conference on Robotics and Automation (ICRA), 6-1—May 2013, Karlsruhe, Germany, IEEE US, May 6, 2013, pp. 3362-3369.
First Examination Report for India Application No. 202217031836; dated Jun. 2, 2023.

* cited by examiner

ARTIFICIAL MUSCLE, EXOSKELETON, RELATED METHOD AND SYSTEM

This application is a national stage entry under 35 USC371 of PCT/EP2020/080916 filed Nov. 4, 2020, International Publication No. WO/2021/089594 A1, which claims the benefit of Belgian Application No. 2019/5762 filed Nov. 4, 2019.

FIELD OF THE INVENTION

The present invention relates to artificial muscles for exoskeletons, exoskeletons, and methods relating to exoskeletons.

BACKGROUND ART

Exoskeletons provide an architecture that is worn over the body of a user, which is actuated to induce or support movement of the user. For example, persons with spinal injuries who cannot control portions of their body are able to enjoy movement with such exoskeletons. Additionally, able-bodied persons are able to augment their abilities with the use of powered exoskeletons, including increasing walking, running or working endurance and increasing their capacity to lift or otherwise manipulate heavy objects on a work floor, in a professional or personal environment, improving or optimising load baring capacity and load. In such an environment, exoskeletons may reduce and/or prevent problems relating to employee injuries, reduced productivity and absenteeism. Moreover exoskeletons may improve ergonomics, optimize ROI of Human Capital and reduce employee turnover.

However, traditional powered exoskeletons have numerous drawbacks. For example, many systems are extremely heavy because the rigid portions of the exoskeleton are conventionally made of metal and electromotor actuators for each joint and are also heavy in addition to the battery pack used to power the actuators. Accordingly, such exoskeletons are inefficient because they must be powered to overcome their own substantial weight in addition the weight of the user and any load that the user may be carrying.

Additionally, conventional exoskeletons are bulky and cumbersome. The rigid metal architecture of the system must extend the length of each body limb that will be powered, and this architecture is congenitally large because it needs to be sufficiently strong to support the body, actuators and other parts of the system in addition to loads carried by the user. Portably battery packs must also be large to provide sufficient power for a suitable user period. Moreover, electromotor actuators are conventionally large as well. Unfortunately, because of their large size, conventional exoskeletons cannot be worn under a user's normal clothing and are not comfortable to be worn while not being actively used. Accordingly, users must put on the exoskeleton each time it is being used and then remove it after each use. Unfortunately, putting on and removing an exoskeleton is typically a cumbersome and time-consuming process. Conventional exoskeletons are therefore not desirable for short and frequent uses.

Additionally, because of their rigid nature, conventional exoskeletons are not comfortable and ergonomic for users and do not provide for complex movements. For example, given their rigid structure, conventional exoskeletons do not provide for the complex translational and rotational movements of the human body, and only provide for basic hinge-like movements. The movements possible with conventional exoskeletons is therefore limited. Moreover, conventional exoskeletons typically do not share the same rotational and translational axes of the human body, which generates discomfort for users and can lead to joint damage where exoskeleton use is prolonged.

US 2018/0098907 and U.S. Pat. No. 9,827,667 disclose related systems and methods but are complex and/or lack flexibility and/or lack means for biofeedback.

WO 2018/168817 A1 U.S. Pat. No. 5,021,064 A, and EP 3 346 142 A1 disclose related devices and methods.

In view of the foregoing, a need exists for improved exoskeletons and artificial muscles suitable for soft exoskeletons and related methods, in an effort to overcome the aforementioned obstacles and deficiencies of conventional exoskeleton systems.

SUMMARY OF THE INVENTION

It is a first aim of the present invention to provide an artificial muscle and related exoskeleton that are lightweight and compact, allowing to obtain an exoskeleton with full mobility, allowing integration into workwear.

In a first aspect, the invention provides an artificial muscle for a soft exoskeleton, the muscle comprising a first and second tendon, each comprising an attachment means for attachment of said muscle to a muscle connector of the exoskeleton;

a muscle core made of a deformable material extending between said first and second tendon, the muscle core preferably comprising an outer sleeve;

wherein each of the first and second tendon is adapted for receiving a respective end of said muscle core; wherein said artificial muscle comprises means for connection of said muscle to an actuator for generating an actuation; wherein the muscle core is adapted to undergo a change in length when being actuated, thereby causing the first and second tendon to move towards each other when said actuation is on or increased, and to move away from each other when said actuation is off or reduced; and wherein preferably said means for connection to said actuator is an actuation interface comprised in the first tendon.

Such an artificial muscle is advantageous in that it is compact and lightweight, and fits into a bio-inspired design for an exoskeleton. The suit provides functional support and activation of the human body. By providing actuation, preferably externally via the actuation interface, the weight of the muscle is decreased. Moreover, such a design may also lead to a weight reduction for an exoskeleton comprising a plurality of artificial muscles and supportive structures, since the muscles may be actuated by a common actuator, instead of separate actuators per muscle.

In a second aspect, the invention provides a soft exoskeleton comprising at least one artificial muscle according to the invention;

a control module comprising an actuator for generating an actuation for said at least one artificial muscle.

Such an exoskeleton is beneficial in that actuation may be provided external to the muscle, leading to a lightweight muscle, from a control module whereof the position may be optimized for ergonomics. Moreover, a plurality of muscles may be actuated by a single actuator, leading to further weight reduction of the exoskeleton.

It is a second aim of the invention to provide a method for controlling an exoskeleton wherein the user is provided with stimuli-based feedback such as haptic feedback, leading to an improved, more intuitive man-machine interface.

In a third aspect, the invention provides method for providing biofeedback to a user of an exoskeleton, the method comprising the steps of:

providing said exoskeleton comprising a control module comprising an actuator for generating an actuation and at least one signal module connected to said control module, wherein the signal module comprises a sensor located in the vicinity of the user;
    measuring, by said sensor, measurement data,
    transmitting, by said signal module, said measurement data to the control unit,
    receiving, by said control unit (4), said measurement data and, based on a level of said actuation and based on said measurement data, generating, respectively, at least one of:
        an instruction for stimuli for providing biofeedback for a stimuli generator comprised in the signal module, or
        a new value for said level of said actuation;
    performing, respectively, at least one of:
        transmitting, by the control unit and to said signal module, said instruction for stimuli; and generating, by said stimuli generator and based on said instruction for stimuli, stimuli, preferably vibrations, for transfer to the user for providing biofeedback; or
        controlling said actuator for generating said actuation based on said new value for providing biofeedback.

In a fourth aspect, the invention provides a system for providing biofeedback to a user of an exoskeleton, the system comprising:

a control module comprising an actuator for generating an actuation;
    at least one signal module connected to said control module, the signal module comprising a sensor, said sensor preferably located in the vicinity of the user;
    wherein the at least one signal module is configured for:
        measuring, via said sensor, measurement data, preferably a pressure originating from a user wearing said exoskeleton;
        transmitting said measurement data to the control unit;
        preferably, receiving an instruction for stimuli from the control unit;
        preferably, generating, via said stimuli generator and based on said instruction for stimuli, stimuli, preferably vibrations, for transfer to the user for providing biofeedback;
    and wherein the control module is configured for:
        receiving, from said at least one signal module (61, 62, 63), said measurement data;
        generating, based on a level of said actuation and based on said measurement data, at least one of
            an instruction for stimuli for providing biofeedback, or
            a new value for said level of said actuation, respectively;
        transmitting, to said signal module (61, 62, 63), said instruction for stimuli and/or controlling said actuator for generating said actuator for generating said actuation based on said new value, respectively.

Such a method and system are advantageous in that they provide the user with biofeedback, which leads to a more user friendly and more intuitive man-machine interface.

In a fifth aspect, the invention provides a control unit comprising an actuator, said control unit configured for generating an actuation for an artificial muscle according to the invention and/or for generating an actuation as part of an exoskeleton according to the invention and/or for performing the method according to the invention and/or for generating an actuation as part of a system according to the invention.

In a sixth aspect, the invention provides a fascial network comprising a plurality of fascial connections for supporting at least one artificial muscle as part of an exoskeleton according to the invention.

BRIEF DESCRIPTION OF THE DRAWINGS

The present invention will be discussed in more detail below, with reference to the attached drawings.

DESCRIPTION OF EMBODIMENTS

Figure 1:
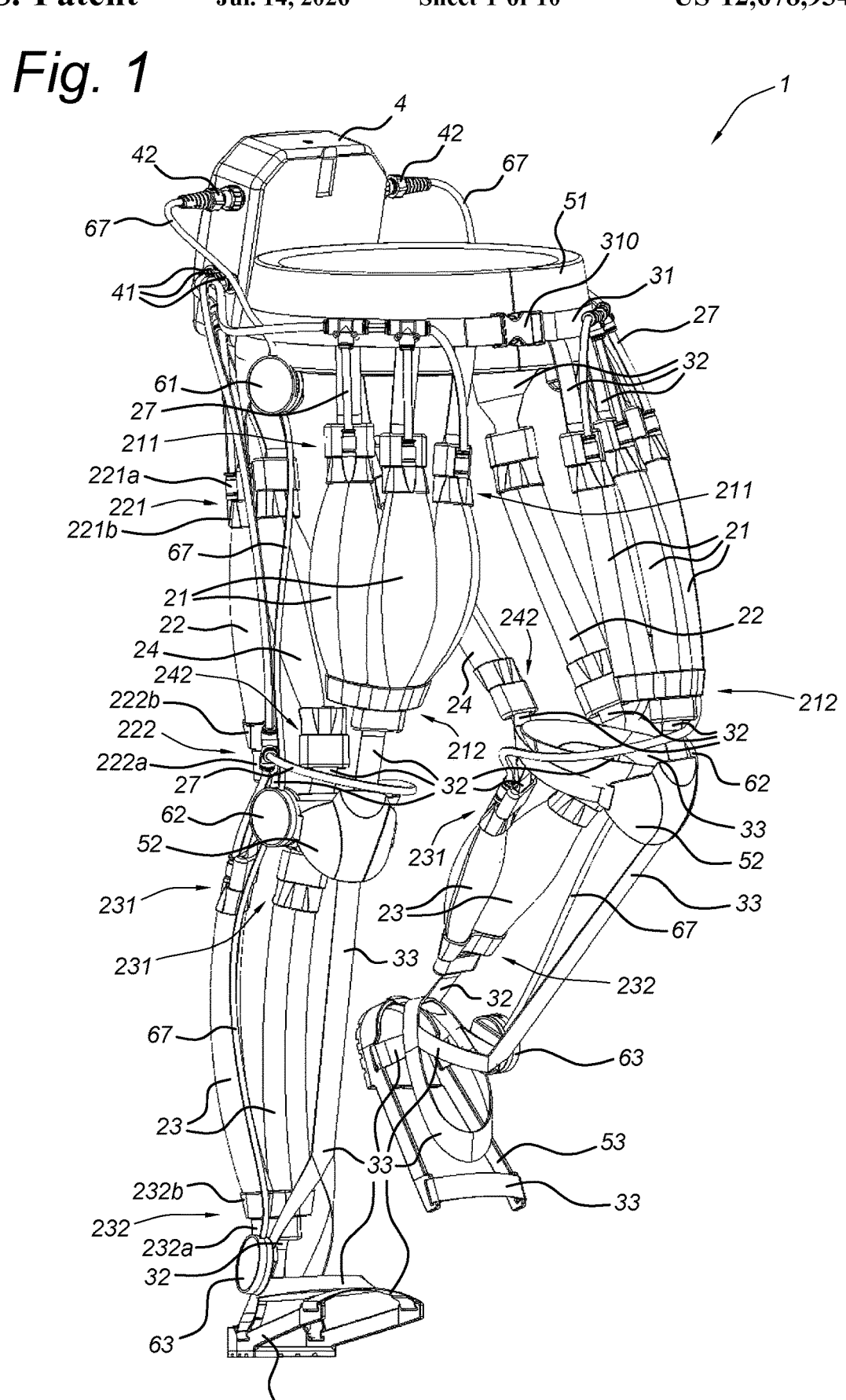
FIG. 1 is a front perspective view of an example embodiment of a soft exoskeleton according to the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

Furthermore, the various embodiments, although referred to as "preferred" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present invention, the only enumerated components of the device are A and B, and further the claim should be interpreted as including equivalents of those components.

The terms "shared tendon" and "non-shared tendon" relates to the number of muscles extending from said tendon. If only a single muscle core extends from said tendon, the tendon is said to be non-shared. If a plurality of muscle cores extends from the tendon, then the tendon is referred to as a shared tendon.

In this document, the term "proprioceptive system" refers to the whole of a user's biological structures and mechanisms enabling the sense of self-movement and body position. Overall, the system relies on mediation by proprioceptors, mechanosensory neurons located within muscles, tendons, and joints, to enable this sense. In the context of this document, the term "proprioceptive system" and "neurologic system" are used interchangeably.

In this document, the terms "control module" and "control unit" are used interchangeably.

Since traditional exoskeletons are deficient, an exoskeleton that provides lightweight and ergonomic actuation of the body can prove desirable and provide a basis for a wide range of applications, such as a system that is wearable under conventional clothing, a system that is soft and pliable, a system that provides for the complex translational and rotational movements of the human body, and/or a system that can be worn comfortably while in use and while not in use. This result can be achieved, according to embodiments of the invention. Thereby, exoskeletons may be used to provide a resistive force for revalidation or sport training purposes. Also, artificial muscles can provide ergonomic or strength enhancing features in the professional and non-professional environment, for example adapting table height, adjusting chair settings in an office, etc.

In preferred embodiments, while the muscle core is adapted to undergo a change in length when being actuated, this may correspond to a muscle pattern being either one of shortening, elongating or maintaining the same length when the artificial muscle is applied to a user, e.g., when the artificial muscle is comprised in an exoskeleton being worn by the user. Particularly, the actuation may generate an actuation force interacting with a second force originating from the user. This second force may comprise either of forces originating directly from the user, e.g., muscle force from the user, and forces originating indirectly from the user or external sources, such as gravitational force being exerted on the user or a load carried by the user. Thereby, the shortening, elongating or maintaining of the same length may relate to different movements or user positions and/or different phases of a sequence of movements and/or different phases of a single movement or user position. For instance, the user may take on some position in which support from the artificial muscle is requested, and the actuation force may be such that actuation does not relate to shortening but instead to supporting during elongating or supporting during an isometric action, whereby the same length is maintained.

In embodiments, said actuation is switched between at least two actuation levels, preferably periodically. This may allow enhanced control over the power exerted.

In embodiments, said actuation is switched between at least two actuation power levels being ON and OFF.

In embodiments, the actuation being on or increased relates to an intensity of the actuation being on or increased, respectively, and the actuation being off or decreased relates to an intensity of the actuation being off or decreased. Herein, the intensity may relate to any or any combination of an actuation amplitude, which may relate to a control over an instantaneous or time-averaged actuation force, and an actuation frequency, which may relate to the actuation being switched between at least two actuation levels, preferably periodically.

In embodiments, said actuation is switched between at least two actuation levels, preferably being ON and OFF, wherein a switching frequency is determined and/or predetermined such that a required muscle pattern is attained. Hereby, the muscle pattern may relate to any of shortening, elongating or maintaining the same length, and said switching may relate to controlling an actuation force in response to a second force being exerted on the artificial muscle. In preferred embodiments, said second force may be measured at the muscle and may be processed to calculate, based on said measured second force, an actuation force and/or actuation frequency. Preferably, the second force is measured at the muscle and received at a control unit and processed by said control unit to generate a suitable actuation intensity, preferably by setting a switching frequency and/or an actuation amplitude.

In embodiments, the artificial muscle comprises one or more means for connection of said muscle core to an actuator for generating an actuation. In embodiments, the means for connection relate to the first tendon comprising an actuation interface as said means for said connection. In embodiments, means for connection of said muscle are comprised in one or more of the first tendon, the second tendon and the muscle core.

In preferred embodiments, the outer sleeve and preferably also the inner sleeves (if present) preferably comprise a flexible sheet material such as woven nylon, rubber, a plastic, latex, a fabric, or the like. More preferably the outer sleeve and preferably also the inner sleeves (if present) comprise a flexible material comprising rubber-nylon, preferably comprising a flexible rubber-nylon mesh system. Such a material advantageously allows a muscle core that is deformable and flexible. Moreover, in embodiments with fluid power based actuation, it may be repeatedly and reversibly inflated and deflated without risk of tear or permanent deformation.

In embodiments according to the invention, said muscle core further comprises one or more inner sleeves extending between the first and second tendon; wherein said outer sleeve extending between the first and second tendon circumferentially surrounds the one or more inner sleeves. In preferred embodiments, the outer sleeve comprises at least two inner sleeves, which are preferably individually actuable. According to a bio-inspired interpretation of the invention, the outer sleeve may be seen as the muscle core whereas the inner sleeves may correspond to individual fascicles, i.e. bundles of muscle fibers. Thereby, the artificial muscle may be provided with one or more features to enhance safety with respect to excessive pressure within the muscle and/or a tear of a portion of the muscle.

In example embodiments, for instance embodiments wherein the actuation is at least partly fluid power based, each of the outer sleeve and, if present, the inner sleeves are impermeable with respect to the fluid that is used for actuation by fluid power. Having an impermeable outer sleeve may have the advantage of the outer sleeve acting as safety net. In case of a closed energy system, energy may be reused at least in part, wherein current remaining pressure of the fluid leaving through the actuation interface may be reused for increasing pressure on one or more muscles at later times, including the muscle itself. In an open energy system, the outflow of the actuation interface is guided to an exhaust, preferably an exhaust comprised in the control unit, without pressure being reused.

In example embodiments, the artificial muscle may be configured such that actuation fluid (if applicable) may at least partially leave the artificial muscle via a safety membrane comprised in the artificial muscle, e.g. as a part of a muscle connector or of one or both of the tendons.

In example embodiments, each of the inner sleeves and the outer sleeve are impermeable.

In example embodiments, wherein actuation may relate to any type of actuation, at least one of the inner sleeves and the outer sleeve is permeable or semi-permeable, whereby preferably the other of the inner sleeves and the outer sleeve are impermeable. Hereby, semi-permeable may relate to a sleeve, preferably an inner layer of a sleeve, being impermeable up to a certain level of internal pressure, and being permeable beyond said level pressure, allowing for, e.g., a fluid such as air to escape. In preferred embodiments, such semi-permeability is reversible, i.e. after pressure decreases again, the material becomes impermeable again.

In example embodiments, at least one of the outer sleeve and the inner sleeves is permeable or semi-permeable. In embodiments wherein at least the outer sleeve is permeable or semi-permeable, this may have the advantage that, if one or more of the inner sleeves is torn, a fluid relating to actuation, preferably a non-toxic fluid, may leave the outer sleeve in a safe manner, i.e. without pressure build-up within the outer sleeve.

In example embodiments, the outer sleeve, preferably the inner layer of the outer sleeve, is impermeable and the inner sleeves, preferably the inner layers of the inner sleeves, are semi-permeable. In such embodiments, when an inner sleeve releases an actuation fluid (if present) from its inside, the fluid may be contained inside the outer sleeve.

The combination of inner and outer sleeve may be advantageous in that it provides enhanced security, whereby the outer sleeve protects the user from the individual movement of the actuated inner sleeves. Moreover, the user is protected by the outer sleeve against impact when one of the inner sleeves would break during use. Another advantage is the more homogenous distribution of actuation power delivered to the inner sleeves over the surface of the muscle, owing to the supporting role of the outer sleeve. Yet another advantage is that the outer sleeve allows to redistribute energy which would otherwise be "lost" after one of the inner sleeves has broken, allowing an overall actuation performance of the muscle which is still similar to the initial performance.

In embodiments according to the invention, said actuation is based at least in part, preferably entirely, on fluid power involving a fluid. The fluid may relate to any fluid, liquid, gas or solid with any aggregation of states.

In embodiments according to the invention, said actuation is based at least in part on fluid power involving a fluid, preferably on pneumatics involving air; wherein said control unit comprises a fluid power actuator, preferably a pneumatics actuator, for inserting fluid into the outer sleeve and/or at least one of the one or more inner sleeves via said actuation interface comprised in said first tendon. Such actuation is advantageous since it allows lightweight muscle design. Moreover, such actuation advantageously allows using a single actuator to actuate a plurality of muscles, preferably by making use of valves, whereby the actuator may selectively inflate and deflate certain muscle cores individually or in groups of muscle cores. Hereby, the valves, if present, are preferably comprised in the control unit: however, one or more valves may also be comprised in the muscle. Alternatively, no valves are comprised in the control unit, and one or more valves, if any, are comprised in the muscle.

In embodiments the actuator may be provided partially or fully integrated as part of the exoskeleton, or alternatively entirely externally. In embodiments, actuation is provided entirely externally by means of an external compressor connected to one or more compressed fluid connectors provided on the exoskeleton, e.g. on the control unit. In example embodiments, the one or more compressed fluid connectors relate to a compressed air tube. In embodiments the actuator may relate to any or any combination of an external air supply, an internal compressor such as a micro-compressor, an internal blower such as a micro-blower, and a hydrogen generator. Thereby, a hydrogen generator may relate to generating compressed hydrogen from water as fuel, wherein this fuel may be used at least to at least partially actuate the at least one artificial muscle, and wherein optionally said fuel may be used for a second application as well. In certain embodiments, actuation may relate solely to hydrogen generation.

In embodiments according to the invention, at least one of said outer sleeve and said one or more inner sleeves comprises an outer layer, preferably a braided outer layer, comprising plurality of perforations provided over its surface, and a flexible inner layer, preferably a silicone inner layer, which is preferably impermeable with respect to said fluid;

wherein a diameter of said perforations is adapted for receiving expanded portions of said inner layer within said perforations during expansion of said muscle upon said insertion of said fluid. In such embodiments, preferably each of the outer sleeve and the inner sleeves are impermeable with respect to the fluid preferably being air.

In preferred embodiments, the plurality of perforations, preferably more than hundred perforations, is distributed essentially uniformly over the surface of the sleeves, so as to provide an even expansion and/or an evenly expanding muscle.

In embodiments, at least one of the said outer sleeve and said one or more inner sleeves comprises said outer layer, preferably said braided outer layer, comprising said plurality of perforations over its surface, but not said flexible inner layer. In embodiments, the outer sleeve comprises said inner and outer layer, but the one or more inner sleeves consist of the outer layer.

Such embodiments advantageously allow to redistribute pressure arising internally, while not allowing external pressure to come in. In other embodiments, the one or more inner sleeves comprise the inner and outer layer, but the outer sleeve consists of the outer layer.

In embodiments, each of the outer sleeve and the one or more inner sleeves comprise both the inner and outer layer. This has the advantage of maximal safety and/or maximal redistribution of pressure in case of rupture on one of the sleeves.

Regardless of whether the outer sleeve and/or the one or more inner sleeves are impermeable to the fluid used, air is an advantageous choice in that it is non-toxic and requires no special provisions to guarantee quality of air inhaled by the user.

In embodiments according to the invention, said muscle comprises one or more further muscle cores made of a deformable material extending between said second tendon and another respective further tendon, one per further muscle core, wherein, for each further muscle core, it is the respective further tendon that comprises a respective further actuation interface, for connection of said respective further muscle core to an actuation means, preferably said actuator. This allows a powerful and lightweight muscle design, wherein multiple muscle cores share a common tendon, yielding a lowered weight, simpler attachment to the exoskeleton and overall a simple exoskeleton when compared to a case with individual attachment of each muscle core separately by means of dedicated tendons. Moreover, this corresponds to a bio-inspired design wherein a physical muscle may have multiple joints sharing a single tendon.

In embodiments according to the invention, at least one of the tendons comprises attachment means accessible from outside of the exoskeleton, for attachment to further portions of the exoskeleton, and wherein said actuation interface, preferably each of said actuation interface and any further actuation interface, is accessible from outside of the exoskeleton. Such embodiments advantageously allow easy maintenance, wherein a single muscle may conveniently be taken out of the exoskeleton, and may conveniently be replaced separately when broken.

In embodiments, the artificial muscle comprises at least one muscle sensor for detection of muscle integrity and/or actuation and/or actuation fluid status, and preferably further comprises a connection interface for connection of said muscle sensor to an external control unit of an exoskeleton comprising said artificial muscle. This is advantageous since it allows for feedback toward the user and/or toward the control unit regarding the operation of the muscle. It may allow, e.g., automatic detection of rupture of a muscle or muscle core, and/or detection of lack of actuation despite actuation being demanded by the control unit, and/or loss of fluid pressure in cases where actuation involves an actuation fluid.

In embodiments according to the invention, the exoskeleton comprises a fascial network comprising a plurality of fascial connections for supporting the at least one muscle, the plurality of fascial connections comprising:

a plurality of muscle connectors connecting the at least one muscle via the first and second tendon to further portions of the fascial network, and a plurality of complementary fascial connections, of which at least one is adapted for providing tightening, preferably releasable tightening, with respect to a user when using the exoskeleton and for supporting the plurality of muscle connectors.

Such embodiments provide the advantage of a lightweight and modular exoskeleton architecture, wherein forces are transferred to and from the body of the user over a large and spread surface, avoiding local strain on the body of the user at the level of the muscle, and hence leading to improved user friendliness.

In embodiments according to the invention, the exoskeleton comprises an actuation connection for connecting the actuation interface of the muscle core to the control unit supported by at least one of the plurality of complementary fascial connections and/or wherein the exoskeleton comprises an anchor element, said anchor element being any of a waist band, an artificial patella or a shoe. By providing an actuation connection that is supported by the fascial network, a compact and reliable exoskeleton is obtained. An advantage of the anchor elements is the improved and user friendly attachment of the exoskeleton to the user. Moreover, in various embodiments, the anchor element may provide a means for integrating electronics, e.g., a daughterboard for actuation, such that the electronics are conveniently integrated in the exoskeleton, rather than being a separate part of it.

In embodiments according to the invention, the exoskeleton comprises at least one signal module connected to the control unit; wherein the signal module (61, 62, 63) comprises a sensor configured to, when the exoskeleton (1) is worn by a user, determine measurement data, for instance measure a pressure, originating from said user and transmit said measurement data to the control unit (4), and/or wherein the signal module (61, 62, 63) comprises a stimuli generator configured to, when the exoskeleton (1) is worn by a user, receive an instruction for stimuli from the control unit (4) and, based on said instruction for stimuli, generate stimuli, preferably vibrations, for transfer to the user, and/or wherein the signal module (61, 62, 63) comprises a visual feedback means, preferably a LED, configured to, when the exoskeleton (1) is worn by a user, receive an instruction for light emission from the control unit (4) and, based on said instruction for light emission, emit light, for providing a visual indication to the user. Such embodiments allow better interaction between the user and the exoskeleton. Particularly, said sensors allow the control unit to provide preventive and curative actions based on sensor measurements. On the other hand, a stimuli generator provides a direct and user friendly means for feedback to the user. A visual feedback means provides the advantage of enhanced monitoring of the exoskeleton's functioning, not only for the user but also for persons in line of sight of the visual feedback means.

In embodiments according to the invention, the signal module comprises at least both said sensor and said stimuli generator; wherein the signal module is configured to, when the exoskeleton is worn by the user, measure measurement data, e.g. a pressure originating from said user, and transmit said measurement data to the control unit, receive an instruction for stimuli from the control unit and, based on said instruction for stimuli, generate stimuli, preferably vibrations, for transfer to the user, wherein the control unit is configured to receive said measurement data and, based at least on said measurement data, generate said instruction for stimuli for providing biofeedback, wherein said generating of said instruction for stimuli is preferably further based on a level of said actuation. Such embodiments are advantageous in that they provide the user with biofeedback, which leads to a more user friendly and more intuitive man-machine interface.

In embodiments according to the invention, the control unit has access to predetermined information regarding the proprioceptive system of the user for generating said instruction for stimuli based at least on both the measurement data and the predetermined information regarding the proprioceptive system of the user. This provides an enhanced user experience for the user, with improved preventive and curative character with respect to the needs of the user. In embodiments, the predetermined information regarding the proprioceptive system may relate to previous measurements by means different from those used for obtaining the measurement data. In example embodiments, two or more stages of measurement may be performed. For instance, one stage may relate to detection and/or forecasting of human muscle activity based on measurement data comprising pressures and/or pressure differences. For instance, another stage may relate to detection and/or forecasting of human muscle activity based on measurement data comprising EMG (electric impulses), which may or may not be comprised in said predetermined information regarding the proprioceptive system. In further examples, another stage may relate to detection and/or forecasting of human muscle activity based on EEG (brain activity), wherein previous measurement data (e.g., relating to EMG) may be comprised in said predetermined information regarding the proprioceptive system.

In embodiments, muscle activity detection is performed based on electric impulses measured in the brain (EEG) and/or based electric impulses measured in the nervous system (e.g., next to the spine) and/or in one or more of the muscles of the user (EMG), and the measurement data comprises data relating to said muscle activity detection.

In embodiments according to the invention, said one or more muscles comprise at least two muscles forming an agonist-antagonist pair or anti-agonist-antagonist pair, wherein the control unit is configured to reduce and/or stop the actuation of one of the pair when the actuation of the other one of the pair is started and/or increased, and/or to start and/or increase the actuation of one of the pair when the actuation of the other one of the pair is started and/or increased. Such embodiments advantageously provide improved predictability, reliability and safety for the user.

In embodiments, one or more muscles are actuated according to a counterforce. This may allow for resistive training, e.g., muscle training for athletics and professional sports, aeronautics and space. In related embodiments, this may relate to a second muscle following a first muscle, according to proportional "following" or to amplified mimicking. In such cases, the control unit may be configured to control the actuation of the second muscle based on the actuation with respect to the first muscle.

In embodiments according to the invention, the exoskeleton relates to the lower limbs, wherein the plurality of complementary fascial connections comprises a hip belt adapted for providing releasable tightening with respect to a user when using the exoskeleton and for supporting the plurality of muscle connectors, wherein said exoskeleton comprises an anchor element being a waist band tightened to the user by said hip belt, and wherein said control unit is supported by said waist band. Such embodiments advantageously allow to guide forces from and to the user via the advantageous combination of a hip belt and waist band, leading to an anatomically advantageous and ergonomic way of attaching the exoskeleton to the user.

The control unit may in principle be placed on any part of the body of the user, or even be merely in the vicinity of the user. In embodiments, the control unit is positioned on the body according to the fascial chains of the user and/or according to the fascial chains of the exoskeleton, which may preferably be aligned with the fascial chains of the user. In embodiments, the artificial muscles are placed on anchor points of the body according to industrial, health and/or personal requirements, and the control unit may be placed in function thereof.

In embodiments, the exoskeleton can be controlled by movement of the user. For example, the control unit (or, equivalently, control module) can sense that the user is walking and carrying a load and can provide powered assistance to the user via the actuators to reduce the exertion associated with the load and walking. Accordingly, in various embodiments, the exoskeleton can react automatically without direct user interaction.

In embodiments, the signal module can include any suitable type of sensor, and the sensors can be located at a central location or can be distributed about the exoskeleton. For example, in some embodiments, the signal module can comprise a plurality of accelerometers, force sensors, position sensors, and the like, at various suitable positions, including near the muscles or at any other body location. In some embodiments, the control module can include an IoT-related interface such as Bluetooth, WiFi or a cellular network interface and/or a GNSS such as the global positioning system (GPS), a camera, a temperature sensor, or the like.

In preferred embodiments, the actuation relates to fluid power with fluids with advantageous properties with respect to thixotropy and/or visco-elasticity.

In preferred embodiments, the fascial network provides for biotensegrity and/or myofascial chains which may lead to modulation or formation of structure relating to the user, e.g., (de)calcification.

In preferred embodiment, the fascial network comprises adjustable and displaceable axes (or evolutes) and centrodes. This relates to instantaneous axes that shift depending on the movement that is possible at the joint.

In embodiments, the fascial network may be described as connective tissue, comprising one or more, or even all combinations of all fascial chains in the human body.

In embodiments, the fascial network comprises non-elastic portions and/or is non-elastic. In embodiments, the fascial network comprises elastic portions and/or is elastic.

In embodiments, portions of the fascial network comprise two or more different layers of materials which may be similar or different. For instance, the fascial network may comprise portions with two layers, whereof one is elastic and one is non-elastic. In embodiments, the layers may be stitched together, or attached together in some other way, to make the layer. In embodiments with at least two layers, layers may be separated by a fluid with advantageous properties, e.g., air, or a lubricant or similar material with advantageous gliding properties that reduces the abrasion resistance between the layers.

In embodiments, the fascial network is the part of the exoskeleton holding a plurality of other parts together, of which at least two of: the one or more muscles, the at least one signal module (if any), the control unit. In embodiments, the fascial network serves to accumulate or distribute the forces of the human body and/or the forces produced by the exoskeleton to other parts of the body. In embodiments, the fascial network extends over the body of the user following the user's fascial chains, preferably according to integrated fascial lines. This may lead to superior distribution of said forces. In related embodiments, said fascial lines are used to modularly attach one or more of the at least one artificial muscle, the at least one signal module, and the control unit.

Such modularity provides for enhanced flexibility in assembling, reassembling or maintaining the exoskeleton.

In embodiments, the fascial network comprises a plurality of layers, one or more of the layers relating to a fascia suit. In embodiments, the fascial network is an integrated whole comprising, preferably consisting of, the fascia suit on which artificial muscles can be attached. In embodiments, the exoskeleton, preferably the fascia suit, wherein the signal modules may or may not be integrated within the fascia suit, comprises means for detecting and/or classifying macro and micro movements, preferably comprising any or any combination of a gyroscope, magnetometer, accelerometer, barometer, an UWB module and/or a GNSS sensor.

In embodiments, the fascial network comprises soft and/or stretchable electronics, preferably being integrated in the fascial network. In preferred embodiments, the electronics comprise one or more of: a stretchable material, such as silicon; embedded liquid or solid conductors. In embodiments, the fascial network comprises stretchable and ubiquitous liquid metal electronics. Preferably, the electronics connect to some connector interface and/or to SMD components. The SMD components may relate to any of an IC, a sensor, a stimuli generator, a LED. In embodiments, the electronics are stretchable electronics, wherein the silicone enclosing the conductors is stretchable and allows incorporation into the fascial network, fascia chains, suits or other textiles for the purpose of providing electric interconnection between any of artificial muscles, control unit and signal module.

In preferred embodiments, the exoskeleton is suitable to be worn over or under and/or integrated in the (work) clothing.

In preferred embodiments, the exoskeleton can be used passively or actively, according to a passive or active mode. Herein, the passive mode may relate to full mobility, in assisting up to a predetermined weight, e.g. 15 kg, in experiencing everything lighter, and being able to keep a difficult posture, e.g. crouched, for long periods. The active mode, on the other hand, may relate to carrying heavy loads exceeding the predetermined weight, e.g. 15 kg, with the suit taking the full load, and full actuation. In embodiments, the switch from active to passive mode, and/or vice-versa, is performed manually by means of a manual switch and/or automatically and/or triggered by an event. In example embodiments, the switch may be mechanically and/or electronically triggered. In embodiments, the switch may relate to plugging the exoskeleton to external actuation power (passive to active) and/or to unplugging the exoskeleton from external actuation power (active to passive). This may relate to mechanical or electronic detection of whether said exoskeleton is connected to external actuation power. In example embodiments, the switch may relate to a software setting, e.g. a software setting relating to an app.

In preferred embodiments, the exoskeleton operates according to a passive or active mode, wherein the active mode relates to at least one artificial muscle being actuated to an active level of actuation and wherein the passive mode relates to said at least one artificial muscle being actuated to a passive level of actuation, wherein said active level of actuation is higher than said passive level of actuation, preferably wherein said active level of actuation corresponds to full actuation and/or preferably wherein said passive level of actuation corresponds to no actuation, and wherein the control unit is configured to detect at least one of (i) a user-movement-based activation trigger for switching from passive mode to active mode, and (ii) a user-movement-based deactivation trigger for switching from active to passive mode. In embodiments, the user-movement-based activation and/or the user-movement-based deactivation trigger relate to a user standing according to a pre-determined pose for a predetermined time. In embodiments, the activation and/or deactivation trigger relate to a user moving according to a pre-determined movement or gesture. In embodiments, the activation and/or deactivation trigger relate to a user no longer standing according to a pre-determined pose for a predetermined time. For example, the control unit may actuate artificial muscles based on the user's intention to make movements, wherein, if the user stands in a certain position or pose and maintains that position, pose or posture, this causes one or more certain muscles to inflate and stay inflated until the user changes posture or makes a new movement. Such differentiation between active and passive mode allows for actuation based on intention and may increase user-friendliness since it allows a user to conveniently switch between levels of facilitation by the exoskeleton.

In embodiments, each of the first and second tendon comprises attachment means for connection to respective portions of an exoskeleton, wherein the attachment means of at least one of the first and second tendon are releasable attachment means for allowing the respective one of the first and second tendon to be inserted and/or removed individually from the exoskeleton and/or are adjustable attachment means for allowing the muscle to be tightened with respect to the exoskeleton. Alternatively or additionally, this may relate to allowing inserting and/or removing inner portions of the muscle core from the outer sleeve and/or from the outer sleeve and the one or more inner sleeves. This may provide the advantage of easy maintenance and/or enhanced modularity when operating the exoskeleton or parts of it.

In embodiments, the attachment means of each of the first and second tendon are releasable attachment means for allowing the artificial muscle to be inserted and/or removed from the exoskeleton. This may provide the advantage that a single muscle may conveniently be taken out of the exoskeleton for reasons of maintenance, and may conveniently be replaced separately when broken. This relates to releasability and/or adjustability of the tendons, and may also relate to the accessibility of said tendons from the outside. In related embodiments, the means for connection to said actuator is an actuation interface comprised in the first tendon being a releasable actuation interface for allowing at least the first tendon, preferably the artificial muscle, to be inserted and/or removed from the soft exoskeleton. Similarly, this may provide the advantage that a single muscle may conveniently be taken out of the exoskeleton for reasons of maintenance, and may conveniently be replaced separately when broken.

In embodiments, each of the first and second tendon is adapted for receiving a respective end of a muscle core; wherein, of said first and second tendon, it is the first tendon that is located closest to said control unit, said first tendon comprising an actuation interface for connection of said muscle core to the control unit. This may be advantageous in that it may minimize the path for the connection between the control unit and the muscles, leading to a lighter and/or more robust exoskeleton.

In embodiments, the first tendon comprises an actuation interface for connection of said muscle core to the control unit, wherein the exoskeleton comprises an actuation connection for connecting the actuation interface of the muscle core to the control unit supported by at least one of the plurality of complementary fascial connections.

In embodiments, the exoskeleton comprises at least one signal module connected to said control module, wherein the signal module comprises at least one of: a stimuli generator configured for generating stimuli, preferably vibrations or light radiation, for transfer to the user and/or an environment of the user; and a sensor located in the vicinity of the user and configured for measuring measurement data relating to the user and/or the environment of the user. In embodiments, the connection to the control module may merely involve powering of the signal module. In preferred embodiments, the connection to the control module relates at least to transmitting an instruction from the control unit to the signal unit.

In embodiments, the control unit is configured for generating, based on stimuli-related data, an instruction for stimuli; and transmitting, to said signal module, said instruction for stimuli; and wherein the stimuli generator is configured for generating said stimuli based on said instruction for stimuli. In embodiments, said stimuli-related data is based partially or entirely on at least one of: measurement data originating from a sensor comprised in the exoskeleton, predetermined information regarding the proprioceptive system of the user, and muscle sensor data.

In embodiments, signal modules may be stand-alone nodes. In embodiments, at least part of signal module is comprised in at least one of: the fascial network, at least one tendon or the muscle core of at least one artificial muscle, the control unit. In embodiments, the muscle sensor comprised in the muscle may be comprised in the signal module.

In embodiments, the exoskeleton of the invention comprises comprising at least one signal module connected to said control module, wherein the signal module comprises a sensor preferably located in the vicinity of the user; wherein the at least one signal module is configured for:

measuring, via said sensor, measurement data, preferably a pressure originating from a user wearing said exoskeleton;

transmitting said measurement data to the control unit;

preferably, receiving an instruction for stimuli from the control unit;

preferably, generating, via said stimuli generator and based on said instruction for stimuli, stimuli, preferably vibrations, for transfer to the user for providing biofeedback;

and wherein the control module is configured for:

receiving, from said at least one signal module, said measurement data;

generating, based on a level of said actuation and based on said measurement data, at least one of an instruction for stimuli for providing biofeedback, or a new value for said level of said actuation, respectively;

transmitting, to said signal module, said instruction for stimuli and/or controlling said actuator for generating said actuator for generating said actuation based on said new value, respectively.

In preferred embodiments, the generating comprises generating each of said instruction for stimuli for providing biofeedback for said stimuli generator comprised in the signal module and said new value for said level of said actuation; and wherein the control module is configured for performing each of transmitting, by the control unit and to said signal module, said instruction for stimuli; and generating, by said stimuli generator and based on said instruction for stimuli, said stimuli, preferably vibrations, for transfer to the user for providing biofeedback; and controlling said actuator for generating said actuation based on said new value for providing biofeedback.

In embodiments, the control module may be comprised at least partially, or entirely, in any of the at least one artificial muscle or the signal module. In embodiments with two or more signal modules, the control module may be comprised at least partially, or entirely, in one or in both of the signal modules. In embodiments, the control module may be comprised at least partially, or entirely, in at least one of the tendons or in the muscle core of at least one artificial muscle. In embodiments, the muscle may be actuated by control means comprised in each muscle separately rather than by an external control module.

In embodiments, the signal module is comprised at least partially, or entirely, in the control module. In embodiments with two or more signal modules, at least one of the signal modules may be comprised in the control module.

In embodiments, the sensor comprises a pressure sensor, wherein said measurement data comprises pressure data relating to a pressure originating from a user wearing said exoskeleton. In preferred embodiments, the pressure sensor comprises a human muscle activity pressure sensor, and the control unit is configured for detecting, based on measurement data comprising muscle activity pressure measured data, an intention of the user regarding an intended movement, such as the user wishing to move their leg forward, or stand up from a seated position. This allows the control unit to generate actuation based at least in part on said detected intention. This has the advantage of enhanced human-machine interaction.

In embodiments, the sensor comprises a light emitter for emission toward the user and/or a light detector for measuring a radiation or reflection from the user, wherein said measurement data comprises light reflection data relating to light reflecting from a user wearing said exoskeleton, or light radiation data relating to light radiated (and not necessarily reflected) from a user wearing said exoskeleton.

In embodiments, said light emitter comprises an IR light emitter and/or said light detector comprises an IR light detector, and/or said light reflection data comprises IR light reflection data and/or said light radiation data comprises IR light radiation data. This may relate, e.g., to an IR light emitter, an IR light detector, and/or a IR light emitter/detector pair.

In embodiments, the sensor comprises at least one of the following sensing means: an accelerometer for positioning or angle of movement detection, a gyroscope, a GNSS sensor, a barometer (for measuring, e.g., temperature and/or pressure and/or humidity), an ultra-wideband (UWB) module, or a magnetometer for measuring angle of movement based on the earth magnetic field or another magnetic field. Alternatively, the magnetometer may relate to movement between a stator and a rotor, said stator and rotor preferably being comprised in said soft exoskeleton. In preferred embodiments, at least one of said sensing means, preferably each of said sensing means, is MEMS-based. In embodiments, sensing means may allow to calculate a change in inertia and/or position and/or a movement of the user. In embodiments, the UWB module may relate to distance estimation between exoskeleton suits or between muscles/signal modules on the suit. It may be advantageous to measure a distance between users, for cooperative tasks or social distancing measures. In embodiments, the UWB module may relate to mitigation of interference detected on one portion of a frequency band by using another portion or wider band instead. In embodiments, the UWB module may relate to using multiple channels in one frequency band or more than one frequency band to be used simultaneously. In embodiments, the sensing means may allow to predict movements by measuring and calculating the exact position of the user, and use a machine learning model to then predict what will happen next and proactively act in function thereof.

In embodiments, the sensor comprises means for measurement of at least one of a body temperature and/or an ambient temperature and/or body humidity and/or ambient humidity and/or ambient light.

In embodiments, said stimuli generator comprises vibration means, wherein said stimuli comprise vibrations for transfer to the user. In embodiments, this may relate to a vibration or stimulus that is generated by the signal module at a given frequency, e.g. 128 Hz, 256 Hz or 512 Hz. In embodiments, said stimulus is generated at a zone of the user's body sensitive to such vibrations, through the specific mechanoreceptors known for this end, e.g., Meissner's corpuscles, Pacinian corpuscles, Ruffini endings and the end-bulbs of Krause relating to mechanoreception and other essential components to ensure optimal proprioception.

In embodiments, said vibrations are generated according to at least two different frequencies and/or in two non-overlapping frequency bands and/or in two frequency bands which are non-overlapping for at least 50%, preferably at least 80%. In embodiments, this may relate to a vibration or stimulus that is generated by the signal module at or around at least two different frequencies, e.g. 128 Hz, 256 Hz or 512 Hz. In embodiments, said stimulus is generated at a zone of the user's body sensitive to such vibrations, through the specific mechanoreceptors mentioned in this application.

In embodiments, said stimuli generator comprises light radiation means, preferably IR light radiation means, for light radiation toward the user. In embodiments, said light radiation means are not combined with light detection means, although alternatively light detection means may also be present. In preferred embodiments, said light radiation relates to IR light in the wavelength range 760 nm to 1000 μm, more preferably in the range 1 to 5 μm, most preferably at about 3 μm. This relates to using the light spectrum and preferably infrared light to adapt and/or optimize micro-circulation in the cardiovascular system comprised of the circulatory system, lymphatic system, etc. It is known that the flow of water in the human body (moisture, blood, etc.) is impacted by light. For instance, the water flow may accelerate under light irradiation, e.g., infrared light irradiation. This may be explained, e.g., based on explanatory models according to which water in contact with light, depending on the wavelength, creates an Exclusion Zone (EZ) and/or 4th phase water which in turn promotes water flow. The technique of using IR light for body remediation is well-known. Hence, it can be used to remediate and/or cure swellings/injuries (e.g. lymphatic drainage) and/or to optimize the prevention and/or recovery process of injuries. In preferred embodiments, a feature of said light radiation is determined based on said measurement data. Examples of said feature are an amplitude, wavelength, duration and/or continuity (pulsed vs. continuous) of said light. Applicant has found that a wavelength of about 3 μm may be particularly advantageous for body remediation.

In embodiments, said signal module comprises visual feedback means, preferably LED lighting, for visual indication toward a surrounding of the user.

In embodiments, said visual feedback means, preferably a LED, is configured to, when the exoskeleton is worn by a user, receive an instruction for light emission from the control unit and, based on said instruction for light emission, emit light, for providing a visual indication to the user.

The invention is not limited by the presence of the user. In embodiments, the user is removed and/or replaced by a dummy supporting structure for obtaining a biorobot.

In embodiments, the signal modules attached to the human body may be used for artificial ergonomic optimization via software and exoskeleton, e.g., a desk or car seat automatically adjusting to seated people. In example embodiments, the car seat is configured to adjust to a seated user based on the pressure that the person applies on the car seat. Such embodiments involve at least a sensor comprised in the seat, but do not require a sensor on the user. In other example embodiments, the car seat is configured to adjust to a seated person based on predetermined information regarding the proprioceptive system of the user, relating to a sensor on the user. In other example embodiments, a combination is provided involving both a sensor on the user and on the car seat.

The invention is not limited to certain parts of the body. In embodiments, the present invention relates e.g. to the foot, with an intelligent dynamic support sole changing its volume and pressure depending on the position and state in which the foot or arch is located.

In embodiments, orthopedic and prosthetic biofeedback is provided to the human body or any other physical object. This may relate to exerting pressure and forces to adjust the freedom of movement of a body part or object depending on the situation in which that object or its environment is situated in.

In embodiments with fluid power based actuation, the fluid may relate and/or comprise one or more of a gas, liquid, solid material and superfluid. The fluid and fluid composition may be chosen in view of advantageous properties with respect to conductivity, magnetism, piezoelectricity, electrical impulses, viscoelasticity, thixotropy, chemical impulses, thermal impulses, acoustic impulses, mechanical impulses, compressibility of the fluid, self-healing effect. Herein, self-healing effect may relate to, e.g., a fluid changing from a liquid or gaseous phase to a solid phase when in contact with the outside environment, so as to automatically detect and fill gaps. In preferred embodiments, the same type of actuation is used for all muscle cores of the exoskeleton.

In embodiments, portions of the fascial network and/or the muscle core and/or the muscle tendons and/or other portions of the exoskeleton are chosen in view of advantageous properties with respect to conductivity, magnetism, piezoelectricity, electrical impulses, viscoelasticity, thixotropy, chemical impulses, thermal impulses, acoustic impulses, mechanical impulses, compressibility of the fluid, self-healing effect.

In preferred embodiments, at least one of the muscles is attached to the fascial network and/or the clothing in which the exoskeleton may be integrated in an adjustable way. This has the advantage of user friendliness, and also results in fewer different sizes being needed.

In preferred embodiments, the muscle material, preferably the muscle core material is such that it contracts or expands along with the user wearing it. This allows that the artificial muscle adapts to the person wearing it.

In preferred embodiments, part of the control logic comprised in the control unit may be provided outside a casing of the control unit, for instance as part of the artificial muscle, for instance the tendon or the actuation interface, or the fascial network.

In preferred embodiments, the signal modules are integrated with respect to the fascial network and/or the muscles and/or the clothing in which the exoskeleton may be integrated. This leads to more compactness and more user friendliness, and may allow optimal proprioception and/or biofeedback.

In embodiments, the artificial muscle comprises a (bio-) mechanical component that contributes to the control of the artificial muscle.

In embodiments, the artificial muscle may be structurally optimized in function of its position on the human body. This optimization may relate to optimal artificial or anatomical function, with for instance a feather structure for space saving, and/or to orientation with respect to vector force optimization (leverage by fascial tension or anchoring points), and/or closing function by circumflex orientation.

In embodiments, the fascial network comprises more than one layer and comprises gliding components between the different layers. In preferred embodiments, the fascial network is a fascia suit comprising more than one layer and comprising gliding components between the different layers.

In embodiments, the fascial network extends over lower and/or higher limbs of the user and/or any other part of the user's body, preferably in a way comparable to the human connective tissue system.

In embodiments, the fascial network is adapted to absorb, accumulate and distribute tensile and compressive forces so that they compensate for each other, e.g. arch bridge. Hereby, the force transfer advantageously ensures that there is no loss of bone structure because the artificially induced length tension leads to bone insertion (structure provocation).

In preferred embodiments, the fascial network is based at least partly on evolutes.

In embodiments, actuation may comprise actuation by means of a hydraulic, thermal, piezo-electric, electrical, chemical, pneumatic, mechanical, acoustic system.

In preferred embodiments, thermal losses due to friction within the exoskeleton, preferably within the fascial network, is reused for other applications, e.g. for warming up work clothing or for providing extra biofeedback.

In embodiments, the fascial network may either be internal or external to the exoskeleton.

In different embodiments, the fascial network may either work passively or actively, i.e. without or with one or more internal or external control systems, respectively.

In embodiments, the control unit comprises a separate casing at the outside and/or comprises a PCB and/or comprises a battery pack to power at least the actuator, preferably both the actuator and the interface with the one or more signal modules. In preferred embodiments the control unit comprises an actuator comprising valves, preferably pneumatic valves.

In preferred embodiments, the signal module comprises visual feedback means, preferably LED lighting or more advanced biodynamic lighting, and/or is preferably adapted to measure pressure impulses and/or generate impulses. Preferably the signal module, either with or without intervention of the control module, is able to determine movement and type of movement.

In preferred embodiments, e.g., embodiments with a plurality of signal modules, the exoskeleton, preferably the control module and the signal modules, are configured to determine distance and/or angle between the signal modules. Such determination may be based on a Cartesian or other coordinate system. The determination may be carried out based on measurement data originating from said one or more sensing means.

In preferred embodiments the one or more signal modules are magnetically resistant and/or shielded for EMI.

In preferred embodiments the one or more signal modules have locations optimized as a function of human anatomy and/or the repair or optimization of structure and function.

In preferred embodiments the one or more signal modules are configured to receive proprioceptive input and/or provide both efference and afference with the neurological system of the user or his/her environment.

In preferred embodiments the one or more signal modules are configured to ensure optimal biofeedback such as controlling the artificial muscles and inhibiting or facilitating the user's muscles and structures.

In preferred embodiments, the one or more stimuli generators are comprised either in a housing of the signal modules or outside of such a housing. In preferred embodiments the one or more stimuli generators generate different frequencies and stimuli (e.g., 128 Hz, 256 Hz and 512 Hz) specifically chosen in function of the specific (mechano) receptors of the human body, e.g. Meisner, Paccini, Ruffini and Krause, wherein preferably the frequency is optimized for the type of mechanoreceptors depending on the position of the stimuli generator, so as to provide alignment with the neurological system of the user. In embodiments, vibrations are generated at at least two different frequencies and/or in two non-overlapping frequency bands and/or in two frequency bands which are non-overlapping for at least 50%, preferably at least 80%.

In preferred embodiments, the biofeedback provided by the one or more stimuli generators is optimized with respect to controlling and adjusting of the user's proprioceptive system. In preferred embodiments, the one or more stimuli generators provide both feedback and feed forward to the neurological system.

In embodiments, actuation based on fluid power may relate to detecting the user's muscle activation based on changes in pressure within an air tube connecting the control unit and the muscle.

In embodiments, said actuation is based at least in part, and preferably entirely, on electric actuation. In such embodiments, actuation may relate to electric pulses originating from the control unit causing actuation of the muscle cores, whereby the muscle cores may comprise a web of piezo-electric fibers positioned such that the muscle core is adapted to undergo a change in length when being actuated, thereby causing the first and second tendon to move towards each other when said actuation received via the actuation interface is on or increased, and to move away from each other when said actuation is off or reduced. Alternatively or additionally, the control unit may comprise a fluid power actuator, preferably a pneumatics actuator, for inserting fluid into at least one of the outer sleeve and, if present, the one or more inner sleeves, via said actuation interface comprised in said first tendon.

In embodiments, said actuation is based at least in part on mechanical stretching, wherein at least one of the muscle cores comprises a stretcher. Preferably, said stretcher exhibits a certain predetermined mechanical resistance to stretching or 'spring' constant. This may relate to complementary and/or combined means of detecting the user's muscle activation. For actuation based at least on fluid power, detecting the user's muscle activation may be based on changes in pressure within an air tube connecting the control unit and the muscle as a muscle activates. For actuation based at least in part on mechanical stretching, detecting the user's muscle activation may relate to detecting a length deformation of the stretcher, which may relate to transmitting a correspondingly measured signal to the control module, preferably the motherboard comprised in the control module, preferably via the signal module, more preferably via the daughterboard comprised in the signal module. In further embodiments, regardless of the actuation means, at least one of the muscle cores may comprise a stretcher, and detecting the user's muscle activation is based on detecting a length deformation of the stretcher.

In embodiments, the exoskeleton comprises one or more contractile elements, said contractile elements preferably being part of said fascial network. These one or more contractile elements may relate to optimizing individual need or functionality. In preferred embodiments, the one or more contractile elements are adapted for being placed in contact and/or in the near vicinity of the arcade of the foot of a user wearing the exoskeleton, and are preferably adapted for restoring or maintaining a functional longitudinal arc of the foot in order to increase and/or restore the load bearing capacity of the foot of the user while using said exoskeleton. This may relate to providing the user or a third party, e.g., a staff supervisor, with data indicative of the weight lifted by the user. Such functionality may relate to performing prior user mass calibration. In preferred embodiments, this may relate to a pressure sensor or force sensor connected to the signal module and provided in contact and/or near vicinity of one foot or both feet of the user, preferably through integration in the sole element of a shoe element that is comprised in the exoskeleton.

In embodiments, the sensor may collect measurement data relating to at least one of: pressure, humidity, temperature, light (body environment and infrared), acceleration, magneto, gyro, sound (mic), EMG signals from muscles, EEG signals from the brain, other forms of muscle and/or brain activity detection.

In embodiments, the stimuli generator may comprise modules for providing at least one of: vibration, sound at one or more frequencies, light over the whole electromagnetic spectrum (or specific spectra such as IR), electricity (e.g. mild sensations/shocks on the body), heat, tactile surfaces, provided either based on an instruction from the control unit or in an autonomous mode.

In embodiments, measurement data is processed by the control unit and used for at least one of actuation of one or more muscles, or safety check of the artificial muscles (e.g., pressure loss).

In embodiments, the exoskeleton and/or the stimuli generator is configured for informing the environment or the user of a poor posture of the user and/or regarding the status of the exoskeleton (e.g., power, safety status).

In embodiments, the exoskeleton and/or the stimuli generator is configured for informing the environment of an actuation of the artificial muscle prior to the actual actuation taking place. This has the advantage of enhanced safety and user-friendliness.

In embodiments, each of the one or more sensors and/or stimuli generators and/or other parts of the exoskeleton are uniquely identifiable, e.g. by means of a Universally Unique Identifier (UUID).

In embodiments, the user's proprioceptive system may be "deceived" to provide actuation feedback different from what a user's movement normally induces, in order to bring the body in a state of readiness and/or to simulate a stimulus. For instance, stimuli relating to light may "fool" the muscles and/or skin and/or connective tissue locally, causing the body to create extra reinforcement in its own muscles and/or skin and/or connective tissue locally. This may lead to enhanced user experience, relating to a form of body-related adjustment, thereby learning to better assess specific situations. This may relate to giving the body feedback on existing impulses/movements, and/or to provide stimuli relating to future movements performed by the soft exoskeleton.

In embodiments, at least one of the artificial muscles comprises an outer sleeve with a plurality of compartments, said compartments preferably structured according to a beehive pattern. Such embodiments may be combined with one or more inner sleeves being comprised in the muscle. An advantage of such compartments is the enhanced security with respect to excessive pressure on the muscle, improved control of pressure drop over the artificial muscle, and potentially easier and cheaper manufacturing particularly in embodiments wherein the number of inner sleeves may be low or zero in view of the presence of the compartments.

In embodiments, at least one of the artificial muscles comprises an outer sleeve comprising one or more inner sleeves of which at least one, in its turn, comprises a further inner sleeve. Such muscle embodiments, corresponding to three or more sleeve layers, may provide enhanced security and/or reduced requirements on material selected for the sleeves.

In embodiments relating to actuation comprising piezoelectricity, at least one of the artificial muscles comprises an outer sleeve comprising one or more inner sleeves of which at least one has a length that is shorter than the length of the outer sleeve. In embodiments, said shorter length is less than 80%, preferably less than 60%, more preferably about or less than 50% of a length of the outer sleeve. In such embodiments, said inner sleeve may comprise a plurality of different pieces attached to each other by means of piezoelectric material. Such embodiments may relate to providing electric impulses to the piezo-electric material, which may cause the piezo-electric material to contract and hence cause the artificial muscle to contract. In embodiments, such actuation may be combined with guiding a fluid through the artificial muscle, which may preferably be an incompressible fluid, for improving maintenance of a shape of the muscle.

In embodiments, at least one of the artificial muscles comprises an outer sleeve with a plurality of compartments, said compartments preferably structured according to a beehive pattern, wherein the compartments comprise one or more compartments, preferably of type A, for receiving fluid of type A and one or more compartments, preferably of type B, for receiving fluid of type B. In preferred embodiments, this may relate to providing a fluid of type A for contraction and expansion of the artificial muscles and a fluid of type B for handling heat generated by a movement of the artificial muscle and/or heat originating from the user and/or heat originating from (work)wear. For instance, the fluid of type B may assist in guiding heat away from the user. In examples, the user may be a fire fighter wearing a heavy and warm uniform with artificial muscles underneath. In embodiments, the fluid of type B may be guided via a web of small tubes to distribute the heat over the whole body via a thin suit, preferably a leotard which may further comprise the fascia network. In such embodiments, the heated fluid of type B may be cooled via a refrigeration (closed) cycle or via absorption cooling or any other means of cooling. In embodiments, once cooled, the fluid of type B may be used to extract or recuperate the heat. In embodiments relating to cold conditions for the user, the cooling cycle may be bypassed such that the heated fluid recirculates in the thin suit without cooling, wherein a temperature of the fluid may increase until a predetermined and/or user-determined temperature is reached. In such embodiments, detecting that a desired temperature is reached may be a trigger for closing at least one of one or more valves. This may allow to stop the circulation and allow to maintain constant temperature. In embodiments, recirculation may be realized in part or entirely based on movement of the user. In embodiments involving a fluid that is incompressible, a web of tubes inside the thin suit may be controlled so that fluid is circulated according to a preconfigured sequence, said sequence preferably being based at least in part on contraction and expansion of the artificial muscles.

In embodiments, the exoskeleton is IoT enabled. This preferably relates to a cloud connection to the exoskeleton, preferably the control module, via a local base station or router and/or via 4G and/or 5G and/or BLE and/or sim card and/or other internet-related technology.

Preferably, this relates to real-time data transmission and/or real-time data reception. In embodiments, the exoskeleton, preferably the control module, comprises an SD card for storing data. This may relate to storing and/or reading data in offline periods, i.e. periods without an internet connection. IoT enablement may relate to pushing data, said data preferably comprising sensor data, into the cloud. This enables to make data externally available for visualization, etc. This may relate to an online platform for interfacing with said data.

In embodiments, a unique identification of a user with respect to the exoskeleton is possible. This is advantageous particularly in cases where people do not own their exoskeleton, and the exoskeleton may be used by a plurality of different users either consecutively or at alternating periods. For such cases, it is advantageous that a user identifies him- or herself with the exoskeleton such that data corresponds with a user rather than with an exoskeleton. In embodiments, the identification relates to NFC, RFID chip or related technology. In embodiments, identification is performed upon starting the exoskeleton, e.g. by means of a user action of pushing a push button on a backpack comprising the control unit. Such identification may comprise the user identifying him- or herself by scanning his or her chip with the chip which is integrated in the exoskeleton or attached to the exoskeleton. In embodiments, such a chip may be integrated in the waist belt, preferably on the front side of the waist belt, and/or may preferably be connected a nearby signal module which is connected with the control module which preferably is IoT enabled.

In embodiments, the exoskeleton, preferably the control module, comprises an SD card for storing data. This may relate to situations wherein no internet access is available, for example in a warehouse. In embodiments, the exoskeleton, preferably the control module, comprises a battery to feed the control unit and preferably also the at least one signal module. In embodiments, the battery is recharged via a connector which may preferably be provided on a surface of the control module, e.g. on top of a backpack comprising the control module. In embodiments, the battery may be recharged wirelessly, e.g., with an electromagnetic inductor backpack and inductor in router-battery charger or 'transformer-like' interface. In embodiments, battery autonomy is at least eight hours, and the user may place a backpack comprising the battery on a router-battery charger unit at the end of a working shift.

In embodiments with fluid power based actuation, recuperation of compressed fluid, preferably air, is provided. This may relate to an air (oxygen) bottle and/or a safety system in case the incoming pressure is higher than the product design pressure. In embodiments, such an air bottle may be used for the exoskeleton as well as for breathing air by the user, e.g. for firefighters in a fire, military purposes, etc. In embodiments, a possibility is provided to the user to detach one or more external energy source and relying at least in part on compressed fluid, preferably compressed air, connected to the exoskeleton, preferably connected to a backpack comprising the control unit.

In embodiments, biofeedback relates solely to signals sent from the exoskeleton to the user, or vice versa. In embodiments, biofeedback relates to signal interaction between the exoskeleton and the user. For instance, when a contraction of the extensors of the knee is initiated, this may be combined with a minimal activation of the flexors of the knee, ensuring optimal antero-posterior stability of the knee, providing backup function of the anterior cruciate ligament. This may be particularly advantageous for users with a damaged cruciate ligament, wherein the activation ratio of the co-contraction may be adjusted such that an optimal function for the individual user is provided.

In embodiments, said measuring of measurement data comprises at least one of measurement of a pressure, a force, temperature, an acceleration, an electric resistance, and/or a vibration-related quantity. The measuring and the measurement data preferably relates to one or more quantities indicative of a user's muscle activity and/or a user's movement, and hence is not limited to measuring solely pressure. The measurement may furthermore relate to including, within the signal module, an accelerometer, e.g., for positioning and direction of multiple signal modules to define angle of movement, and/or a magnetometer, e.g., for measuring angle of movement based on magnetic fields such as the earth magnetic field. In embodiments, the measuring relates to any or any combination of temperature, humidity, ambient light, an EM frequency band, an IR band, preferably an IR band on the body of the user.

In embodiments according to the invention, the exoskeleton relates to the lower limbs of the user. However, the exoskeleton may relate to any limb or group of limbs or other part of the user's body, such as the upper limbs, or a combination of the upper and lower limbs.

In various embodiments, the signal module does not comprise a stimuli generator but only a sensor.

According to further aspects, which are not intended to limit the scope of the invention, the invention provides the artificial muscle for an application that does not relate to soft exoskeletons. This may relate to artificial muscles that provide ergonomic or strength enhancing features in the professional and non-professional environment, for example adapting table height, or adjusting chair settings in an office.

According to further aspects, which are not intended to limit the scope of the invention, the invention provides a signal-module-related method for providing biofeedback to a user wearing at least one signal module on the body, regardless of whether an exoskeleton is present. The signal-module-related method may comprise the steps of:

providing a control module and said at least one signal module connected to said control module, the at least one signal module comprising a sensor and a stimuli generator, said control module preferably comprising an actuator for generating an actuation;

measuring, by said sensor, measurement data, e.g. a pressure, originating from said user wearing said at least one signal module on the body, transmitting, by said signal module, said measurement data to the control unit, receiving, by said control module, said measurement data and, based on a level of said actuation and based on said measurement data, generate an instruction for stimuli for providing biofeedback, transmitting, by the control unit and to said signal module, said instruction for stimuli;

generating, by said stimuli generator and based on said instruction for stimuli, stimuli, preferably vibrations, for transfer to the user for providing biofeedback.

According to further aspects, which are not intended to limit the scope of the invention, the invention provides a signal-module-related device for providing biofeedback to a user wearing at least one signal module on the body, regardless of whether an exoskeleton is present. The signal-module-related device comprises:

a control module, said control module preferably comprising an actuator for generating an actuation;

said at least one signal module connected to said control module, the signal module comprising a sensor and a stimuli generator;

wherein the at least one signal module is configured for:

measuring, via said sensor, measurement data, e.g., a pressure originating from said user wearing said at least one signal module on the body;

transmitting said measurement data to the control unit;

receiving an instruction for stimuli from the control unit;

generating, via said stimuli generator and based on said instruction for stimuli, stimuli, preferably vibrations, for transfer to the user for providing biofeedback;

and wherein the control module is configured for:

receiving, from said at least one signal module, said measurement data;

generating, based on a level of said actuation and based on said measurement data, an instruction for stimuli for providing biofeedback;

transmitting, to said signal module, said instruction for stimuli.

According to further aspects, which are not intended to limit the scope of the invention, the invention provides an artificial muscle for a soft exoskeleton, the muscle comprising a first and second tendon, each comprising an attachment means for attachment of said muscle to a muscle connector of the exoskeleton;

a muscle core made of a deformable material extending between said first and second tendon, the muscle core comprising an outer sleeve;

wherein each of the first and second tendon is adapted for receiving a respective end of said muscle core; wherein the first tendon comprises an actuation interface for connection of said muscle core to an actuator for generating an actuation; wherein the muscle core is adapted to undergo a change in length when being actuated, thereby causing the first and second tendon to move towards each other when said actuation received via the actuation interface is on or increased, and to move away from each other when said actuation is off or reduced.

According to further aspects, which are not intended to limit the scope of the invention, the invention provides a soft exoskeleton comprising at least one, preferably at least two, artificial muscle according to the invention;

a control module comprising an actuator for generating an actuation for said at least one artificial muscle;

wherein each of the first and second tendon is adapted for receiving a respective end of said muscle core; wherein, of said first and second tendon, it is the first tendon that is located closest to said control unit, said first tendon comprising an actuation interface for connection of said muscle core to the control unit; and wherein the muscle core is adapted to undergo a change in length when being actuated, thereby causing the first and second tendon to move towards each other when the actuation received via the actuation interface is on or increased, and to move away from each other when said actuation is off or reduced.

According to further aspects, which are not intended to limit the scope of the invention, the invention provides a method for providing biofeedback to a user of an exoskeleton, the method comprising the steps of:

providing said exoskeleton comprising a control module comprising an actuator for generating an actuation and at least one signal module connected to said control module, wherein the signal module comprises a sensor and a stimuli generator;

measuring, by said sensor, measurement data, e.g. a pressure, originating from a user wearing said exoskeleton, transmitting, by said signal module, said measurement data to the control unit, receiving, by said control module, said measurement data and, based on a level of said actuation and based on said measurement data, generate an instruction for stimuli for providing biofeedback, transmitting, by the control unit and to said signal module, said instruction for stimuli;

generating, by said stimuli generator and based on said instruction for stimuli, stimuli, preferably vibrations, for transfer to the user for providing biofeedback.

According to further aspects, which are not intended to limit the scope of the invention, the invention provides a system for providing biofeedback to a user of an exoskeleton, the system comprising:

a control module comprising an actuator for generating an actuation;

at least one signal module connected to said control module, the signal module comprising a sensor and a stimuli generator;

wherein the at least one signal module is configured for:

measuring, via said sensor, measurement data, e.g., a pressure, originating from a user wearing said exoskeleton;

transmitting said measurement data to the control unit;

receiving an instruction for stimuli from the control unit;

generating, via said stimuli generator and based on said instruction for stimuli, stimuli, preferably vibrations, for transfer to the user for providing biofeedback;

and wherein the control module is configured for:

receiving, from said at least one signal module, said measurement data;

generating, based on a level of said actuation and based on said measurement data, an instruction for stimuli for providing biofeedback;

transmitting, to said signal module, said instruction for stimuli.

In embodiments, the invention provides a method for providing biofeedback to a user of an exoskeleton, the method comprising the steps of:

providing said exoskeleton comprising a control module comprising an actuator for generating an actuation and at least one signal module connected to said control module, wherein the signal module comprises a sensor and a stimuli generator;

measuring, by said sensor, measurement data, e.g., a pressure, originating from a user wearing said exoskeleton, transmitting, by said signal module, said measurement data to the control unit, receiving, by said control module, said measurement data and, based on a level of said actuation and based on said measurement data, generate an instruction for stimuli for providing biofeedback, transmitting, by the control unit and to said signal module, said instruction for stimuli;

generating, by said stimuli generator and based on said instruction for stimuli, stimuli, preferably vibrations, for transfer to the user for providing biofeedback.

In embodiments, the invention provides a system for providing biofeedback to a user of an exoskeleton, the system comprising:

a control module comprising an actuator for generating an actuation;

at least one signal module connected to said control module, the signal module comprising a sensor and a stimuli generator;

wherein the at least one signal module is configured for:

measuring, via said sensor, measurement data, e.g., a pressure, originating from a user wearing said exoskeleton;

transmitting said measurement data to the control unit;

receiving an instruction for stimuli from the control unit;

generating, via said stimuli generator and based on said instruction for stimuli, stimuli, preferably vibrations, for transfer to the user for providing biofeedback;

and wherein the control module is configured for:

receiving, from said at least one signal module, said measurement data;

generating, based on a level of said actuation and based on said measurement data, an instruction for stimuli for providing biofeedback;

transmitting, to said signal module, said instruction for stimuli.

In embodiments, the invention provides a method for providing biofeedback to a user of an exoskeleton, the method comprising the steps of:

providing said exoskeleton comprising a control module comprising an actuator for generating an actuation and at least one signal module connected to said control module, wherein the signal module comprises a sensor;

measuring, by said sensor, measurement data, e.g., a pressure, originating from a user wearing said exoskeleton, transmitting, by said signal module, said measurement data to the control unit, receiving, by said control module, said measurement data and, based on a level of said actuation and based on said measurement data, generate:

a new value for said level of said actuation;

controlling said actuator for generating said actuation based on said new value.

In embodiments, the invention provides a system for providing biofeedback to a user of an exoskeleton, the system comprising:

a control module comprising an actuator for generating an actuation;

at least one signal module connected to said control module, the signal module comprising a sensor;

wherein the at least one signal module is configured for:

measuring, via said sensor, measurement data, e.g. a pressure, originating from a user wearing said exoskeleton;

transmitting said measurement data to the control unit; and wherein the control module is configured for:

receiving, from said at least one signal module, said measurement data;

generating, based on a level of said actuation and based on said measurement data, a new value for said level of said actuation;

controlling said actuator for generating said actuator for generating said actuation based on said new value.

The invention may be further understood from following clauses 1-16, which are not intended to limit the scope of the invention in any way.

Clause 1. An artificial muscle (21, 22, 23, 24) for a soft exoskeleton (1), the muscle (21, 22, 23, 24) comprising a first (211, 221, 231, 241) and second (212, 222, 232, 242) tendon, each comprising an attachment means (227) for attachment of said muscle to a muscle connector (32) of the exoskeleton (1);

a muscle core (223) made of a deformable material extending between said first (211, 221, 231, 241) and second (212, 222, 232, 242) tendon, the muscle core (223) comprising an outer sleeve (225);

wherein each of the first and second tendon (211, 221, 231, 241, 212, 222, 232, 242) is adapted for receiving a respective end of said muscle core (223); wherein the first tendon (211, 221, 231, 241) comprises an actuation interface (229) for connection of said muscle core (223) to an actuator for generating an actuation; wherein the muscle core (223) is adapted to undergo a change in length when being actuated, thereby causing the first and second tendon (211, 221, 231, 241, 212, 222, 232, 242) to move towards each other when said actuation received via the actuation interface (229) is on or increased, and to move away from each other when said actuation is off or reduced.

Clause 2. Artificial muscle (21, 22) according to clause 1, wherein said muscle core (223) further comprises one or more inner sleeves (224) extending between the first (221) and second (222) tendon; wherein said outer sleeve (225) extending between the first (221) and second (222) tendon circumferentially surrounds the one or more inner sleeves (224).

Clause 3. Artificial muscle (21, 22, 23, 24) according to clauses 1 or 2, wherein said actuation is based at least in part on fluid power involving a fluid, preferably on pneumatics involving air; wherein said control unit (4) comprises a fluid power actuator, preferably a pneumatics actuator, for inserting fluid into the outer sleeve (223) and/or at least one of the one or more inner sleeves (225) via said actuation interface (229) comprised in said first tendon (211, 221, 231, 241).

Clause 4. Artificial muscle (21, 22, 23, 24) according to clause 3, wherein at least one of said outer sleeve (225) and said one or more inner sleeves (224) comprises an outer layer, preferably a braided outer layer, comprising plurality of perforations (226) provided over its surface, and a flexible inner layer, preferably a silicone inner layer, which is impermeable with respect to said fluid;

wherein a diameter of said perforations is adapted for receiving expanded portions of said inner layer within said perforations during expansion of said muscle upon said insertion of said fluid.

Clause 5. Artificial muscle (21, 23) according to any of clauses 1-4, wherein said muscle comprises one or more further muscle cores made of a deformable material extending between said second tendon (212, 232) and another respective further tendon (211, 231), one per further muscle core, wherein, for each further muscle core, it is the respective further tendon that comprises a respective further actuation interface (229), for connection of said respective further muscle core to an actuation means, preferably said actuator.

Clause 6. Artificial muscle (21, 22, 23, 24) according to any of clauses 1-5, wherein at least one of the tendons (211, 221, 231, 241, 212, 222, 232, 242) comprises attachment means (227) accessible from outside of the exoskeleton (1), for attachment to further portions of the exoskeleton (1), and wherein said actuation interface (229), preferably each of said actuation interface and any further actuation interface (229), is accessible from outside of the exoskeleton (1).

Clause 7. A soft exoskeleton (1) comprising
at least one artificial muscle (21, 22, 23, 24) according to any of clauses 1-6;
a control unit (4) comprising an actuator for generating an actuation for said at least one artificial muscle (21, 22, 23, 24);
wherein each of the first and second tendon (211, 221, 231, 241, 212, 222, 232, 242) is adapted for receiving a respective end of said muscle core (223); wherein, of said first and second tendon, it is the first tendon (211, 221, 231, 241) that is located closest to said control unit (4), said first tendon (211, 221, 231, 241) comprising an actuation interface (229) for connection of said muscle core (223) to the control unit (4); and wherein the muscle core (223) is adapted to undergo a change in length when being actuated, thereby causing the first and second tendon (211, 221, 231, 241, 212, 222, 232, 242) to move towards each other when the actuation received via the actuation interface (229) is on or increased, and to move away from each other when said actuation is off or reduced.

Clause 8. Soft exoskeleton (1) of clause 7, further comprising a fascial network comprising a plurality of fascial connections (31, 32, 33) for supporting the at least one muscle (21, 22, 23, 24), the plurality of fascial connections (31, 32, 33) comprising:
a plurality of muscle connectors (32) connecting the at least one muscle (21, 22, 23, 24) via the first and second tendon (211, 221, 231, 241, 212, 222, 232, 242) to further portions of the fascial network, and
a plurality of complementary fascial connections (31, 33), of which at least one (31) is adapted for providing tightening, preferably releasable tightening, with respect to a user when using the exoskeleton (1) and for supporting the plurality of muscle connectors (32).

Clause 9. Soft exoskeleton (1) of clause 8, wherein the exoskeleton (1) comprises an actuation connection (27) for connecting the actuation interface (229) of the muscle core (223) to the control unit (4) supported by at least one of the plurality of complementary fascial connections (31, 33) and/or wherein the exoskeleton (1) comprises an anchor element (51, 52, 53), said anchor element being any of a waist band (51), an artificial patella (52) or a shoe (53).

Clause 10. Soft exoskeleton (1) of any of clauses 7-9, further comprising at least one signal module (61, 62, 63) connected to the control unit (4),
wherein the signal module (61, 62, 63) comprises a sensor configured to, when the exoskeleton (1) is worn by a user, measure a pressure originating from said user and transmit said measured pressure data to the control unit (4), and/or
wherein the signal module (61, 62, 63) comprises a stimuli generator configured to, when the exoskeleton (1) is worn by a user, receive an instruction for stimuli from the control unit (4) and, based on said instruction for stimuli, generate stimuli, preferably vibrations, for transfer to the user, and/or
wherein the signal module (61, 62, 63) comprises a visual feedback means, preferably a LED, configured to, when the exoskeleton (1) is worn by a user, receive an instruction for light emission from the control unit (4) and, based on said instruction for light emission, emit light, for providing a visual indication to the user.

Clause 11. Soft exoskeleton (1) of clause 10, wherein the signal module (61, 62, 63) comprises at least both said sensor and said stimuli generator; wherein the signal module (61, 62, 63) is configured to, when the exoskeleton (1) is worn by the user,
measure pressure originating from said user and transmit said measured pressure data to the control unit (4),
receive an instruction for stimuli from the control unit (4) and, based on said instruction for stimuli, generate stimuli, preferably vibrations, for transfer to the user,
wherein the control unit (4) is configured to receive said measured pressure data and, based at least on said measured pressure data, generate said instruction for stimuli for providing biofeedback, wherein said generating of said instruction for stimuli is preferably further based on a level of said actuation.

Clause 12. Soft exoskeleton (1) of clause 11, wherein the control unit (4) has access to predetermined information regarding the proprioceptive system of the user for generating said instruction for stimuli based at least on both the measurement data pressure data and the predetermined information regarding the proprioceptive system of the user.

Clause 13. Soft exoskeleton (1) of clauses 7-12, wherein said one or more muscles (21, 22, 23, 24) comprise at least two muscles (21, 22, 23, 24) forming an agonist-antagonist pair, wherein the control unit (4) is configured to reduce and/or stop the actuation of one of the pair when the actuation of the other one of the pair is started and/or increased.

Clause 14. Soft exoskeleton (1) of clauses 9-13, wherein the exoskeleton (1) relates to the lower limbs, wherein the plurality of complementary fascial connections (31, 33) comprises a hip belt (31) adapted for providing releasable tightening with respect to a user when using the exoskeleton (1) and for supporting the plurality of muscle connectors (32), wherein said exoskeleton (1) comprises an anchor element (51, 52, 53) being a waist band (51) tightened to the user by said hip belt (31), and wherein said control unit (4) is supported by said waist band (51).

Clause 15. A method for providing biofeedback to a user of an exoskeleton (1), the method comprising the steps of:
providing said exoskeleton (1) comprising a control unit (4) comprising an actuator for generating an actuation and at least one signal module (61, 62, 63) connected to said control unit (4), wherein the signal module (61, 62, 63) comprises a sensor and a stimuli generator;
measuring, by said sensor, a pressure originating from a user wearing said exoskeleton (1),
transmitting, by said signal module (61, 62, 63), said measured pressure data to the control unit (4),
receiving, by said control unit (4), said measured pressure data and, based on a level of said actuation and based on said measured pressure data, generate an instruction for stimuli for providing biofeedback,
transmitting, by the control unit (4) and to said signal module (61, 62, 63), said instruction for stimuli;

generating, by said stimuli generator and based on said instruction for stimuli, stimuli, preferably vibrations, for transfer to the user for providing biofeedback.

Clause 16. A system for providing biofeedback to a user of an exoskeleton (1), the system comprising:

a control unit (4) comprising an actuator for generating an actuation;

at least one signal module (61, 62, 63) connected to said control unit (4), the signal module (61, 62, 63) comprising a sensor and a stimuli generator;

wherein the at least one signal module (61, 62, 63) is configured for:

measuring, via said sensor, a pressure originating from a user wearing said exoskeleton (1);

transmitting said measured pressure data to the control unit (4);

receiving an instruction for stimuli from the control unit (4);

generating, via said stimuli generator and based on said instruction for stimuli, stimuli, preferably vibrations, for transfer to the user for providing biofeedback;

and wherein the control unit (4) is configured for:

receiving, from said at least one signal module (61, 62, 63), said measured pressure data;

generating, based on a level of said actuation and based on said measured pressure data, an instruction for stimuli for providing biofeedback;

transmitting, to said signal module (61, 62, 63), said instruction for stimuli.

Example 1

Figure 2:
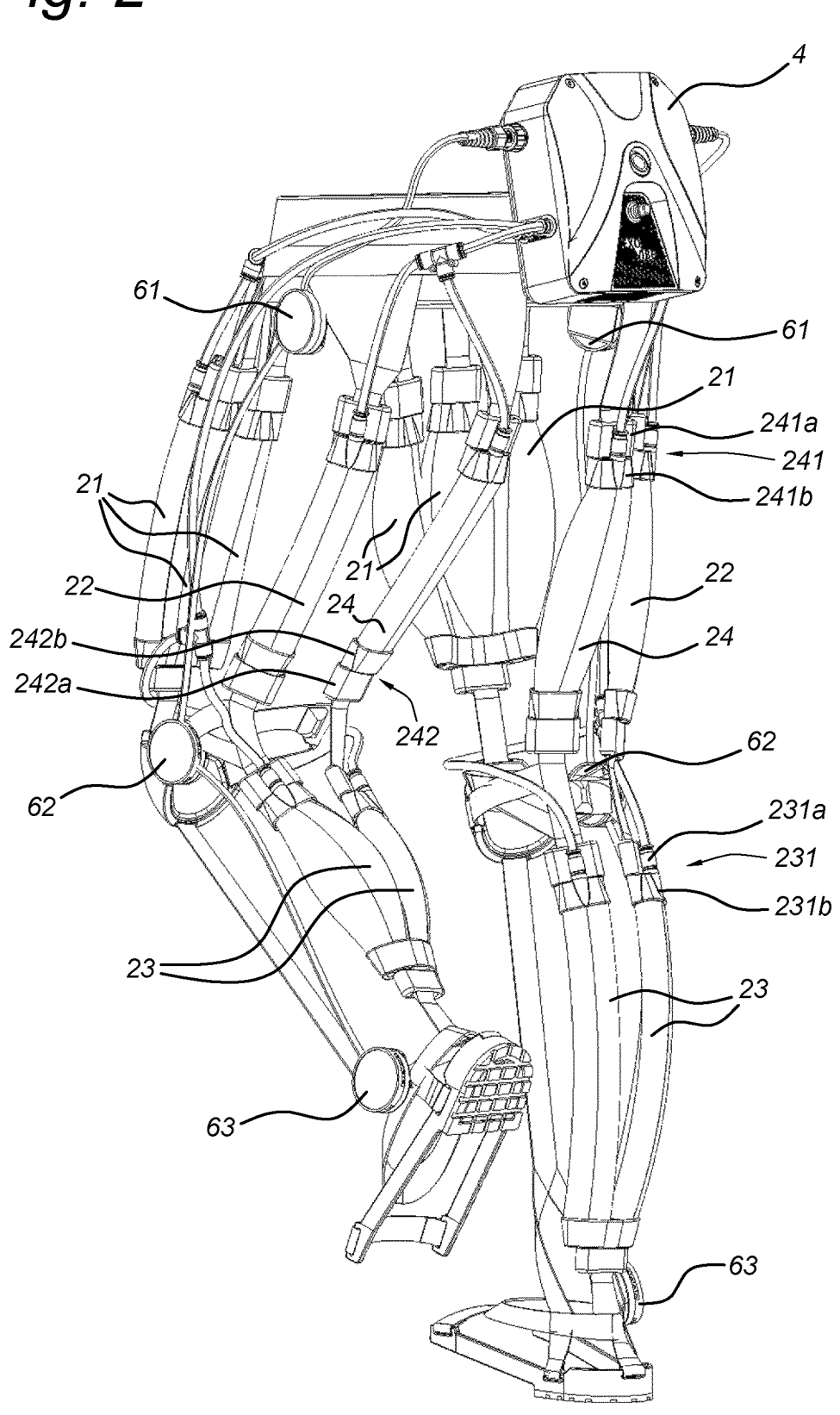
FIG. 2 is a back perspective view of an example embodiment of a soft exoskeleton according to the present invention.
Figure 3:
FIG. 3 shows a first rendering of the front perspective view of FIG. 1, wherein only a selection of components is shown.
Figure 4:
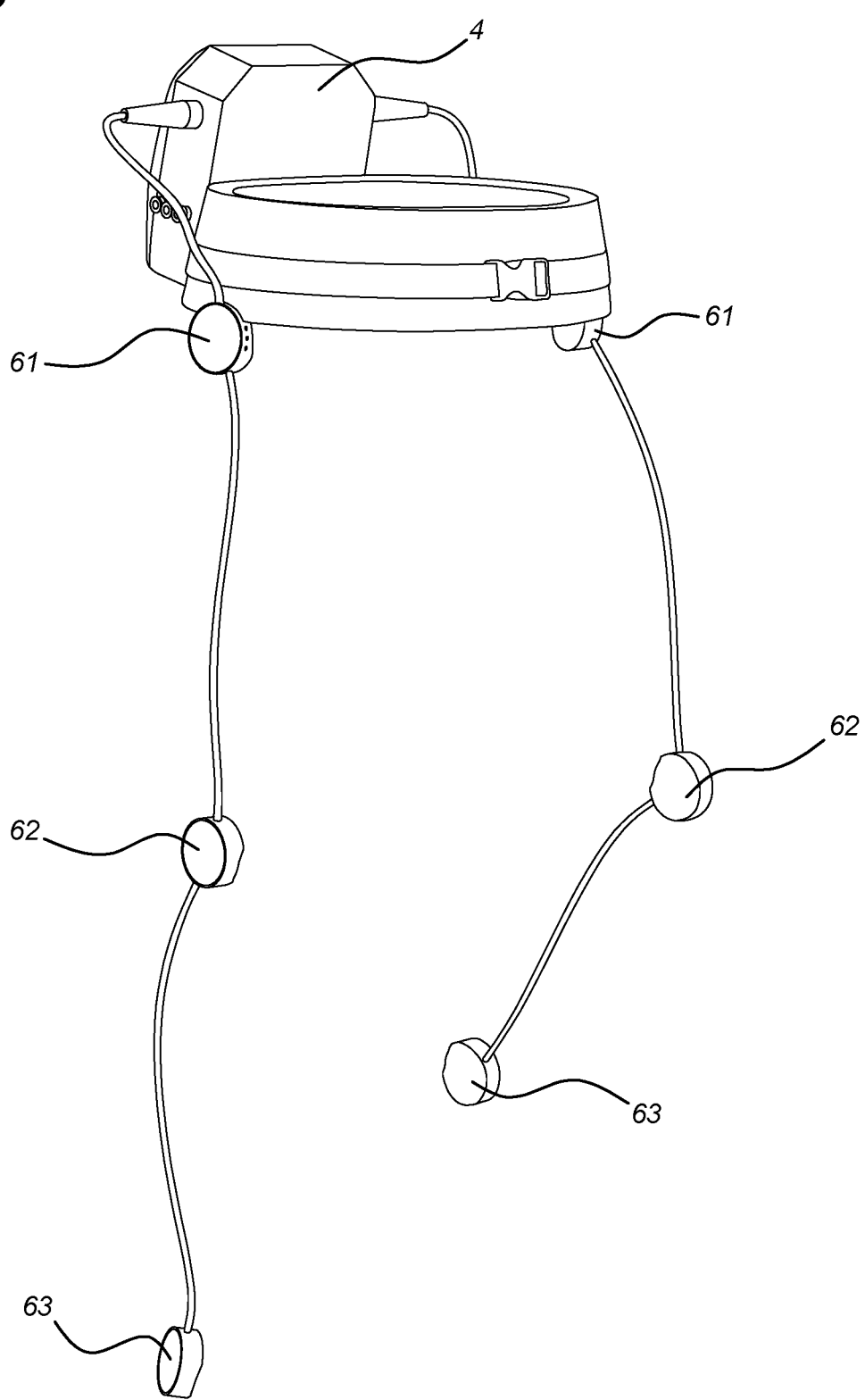
FIG. 4 shows a second rendering of the front perspective view of FIG. 1, wherein only a selection of components is shown.

FIGS. 1 and 2 illustrate a front perspective view and a back perspective view of an example embodiment of a soft exoskeleton 1 according to the present invention. FIGS. 3 and 4 are renderings of the front perspective view of FIG. 1, wherein only a selection of components is shown.

The soft exoskeleton 1 comprises a control module 4 provided with a plurality of actuator connectors 41 and signal connectors 42, a plurality of artificial muscles 21, 22, 23, 24 connected to the actuator connectors 41 of said control module 4 via actuation connections 27; a plurality of signal modules 61, 62, 63 connected to the signal connectors 42 of said control module 4 via signal connections 67, a plurality of anchor elements 51, 52, 53 including a waist band 51, two artificial patellas 52 and two shoes 53, as well as a fascial network comprising a plurality of fascial connections 31, 32, 33 for connecting and/or supporting the muscles 21, 22, 23, 24, the actuation connections 27, the signal modules and the anchor elements 51, 52, 53.

Of said components, for the sake of presentation, FIG. 3 shows the muscles 21, 22, 23, 24 and the actuation connections 27 along with the entire fascial network and all the anchor elements 51, 52, 53 but not the signal modules 61, 62, 63 and not the signal connections 67. Complementary to this, for the sake of presentation, FIG. 4 shows the signal modules 61, 62, 63 and the signal connections 67 but neither of the muscles 21, 22, 23, 24 and the actuation connections 27, and only part of the fascial network and all the anchor elements 51, 52, 53, i.e. only the waist band 51 and the hip belt 31.

The control module 4 comprises a plurality of actuator connectors 41 and signal connectors 42. The actuation connectors 41 connect to and are fed by an actuator (not shown) comprised in the control module 4, preferably a pneumatic actuator. The signal connectors 42 connect to a signal module (not shown) comprised in the control module 4.

While the invention is not limited in relation to any limb or part of a limb, in this example, an exoskeleton 1 is provided for the lower limbs. The exoskeleton 1 comprises four artificial muscles 21, 22, 23, 24 per leg, of which three muscles 21, 22, 24 are associated with the upper leg and one two-jointed muscle 23, i.e. a muscle with two muscle cores, with the lower leg. Thereby, each of the artificial muscles 21, 22, 23, 24 is provided so as to be suitably positioned with respect to the (actual) physical muscles of a user when wearing the exoskeleton 1. As for the three artificial muscles 21, 22, 24 associated with the upper leg, on the one hand, one three-jointed muscle 21, i.e. a muscle with three muscle cores, is provided in the proximity of locations of portions of the quadriceps of the user, whereas the other two muscles 22, 24 are provided in the proximity of locations of portions of the semitendinosus muscle, in case of muscle 24, and the biceps femoris muscle, in case of muscle 22, of the user. The artificial muscle 23 associated with the lower leg, on the other hand, is provided in the proximity of respective portions of each of the two joints of the gastrocnemius muscle. As such, the invention provides muscles 21, 23 which extend between a respective first tendon 211, 231 and a respective shared single second tendon 212, 232 being endpoint for a plurality of muscles 21, 23. Furthermore, the invention also provides single-joint or single-core muscles 22, 24 which extend between a pair (221, 222), (241, 242) of respective first (221, 241) and "non-shared" second (222, 242) tendons. Hereby, the generated or conducted forces preferably are not only transmitted to the inert structures, for example the artificial tendons, but are also diverted and absorbed in the artificial soft tissues of the fascial network, allowing optimal loading and force distribution, based on anatomy.

The fascial network comprises muscle connectors 32 connecting the muscles 21, 22, 23, 24 via tendons 211, 221, 231, 241, 212, 222, 232, 242 to further portions of the fascial network, and complementary fascial connections 31, 33 for connection between and/or support of respective portions of the exoskeleton 1. The complementary fascial connections 31, 32 include a releasably attachable hip belt 31 comprising releasable attachment means 310. The hip belt 31 serves multiple purposes. First; the hip belt 31 provides tightening of the waist band 51 around the waist of a user when using the exoskeleton 1. Second, the hip belt 31 serves as support to the plurality of muscle connectors 32 extending between the hip belt 31 and all or part of the muscles, in this case the muscles 21, 22 of the upper leg. Third, the hip belt 31 provides support to the actuation connections 27 such as the actuation connection branching points, as is shown on the figures.

Attachment of the exoskeleton 1 to the body of the user is provided mainly through the combination of the fascial network and the anchor elements 51, 52, 53. This attachment allows for effective transfer of forces between the exoskeleton 1 and the user, and vice versa. Support for the control unit 4 is provided by the waist band 51, which is held tight around the waist of the user by the waist belt 31. At the same time, forces are transferred effectively to the body of the user via the artificial patellas 52 and the shoes 53, which allow the exoskeleton to be clamped around the body of the user at locations that are structurally supported by the (physical) skeleton of the user. Finally, said transfer of forces is also provided directly by portions of the fascial network. One example are the complementary facial connections 33 secondly extending from the respective patella 52 and branching out to the lateral and medial side of the respective ankle of the user. Another example are the complementary facial connections 33 circularly extending from the respective patella 52 and surrounding the knee of the user. Another example are the complementary facial connections 33 circumferentially surrounding the respective bridge and heel of the foot of the user. Transfer of forces relates to effectively transferring forces originating from the different muscles 21, 22, 23, 24 actuated by the control unit 4, i.e. forces transferred from the exoskeleton 1 to the user, but equally relate to effective transfer of forces originating from the user and being transferred to the exoskeleton 1. A balanced transfer of forces is important to enable a good user experience, wherein the exoskeleton 1 is experienced as being an extension of the body of the user.

The artificial muscles 21, 22, 23, 24 extend between two endpoints being a first artificial tendon 211, 221, 231, 241 and a second artificial tendon 212, 222, 232, 242. Each tendon comprises a fascia-related part 211*a*, 221*a*, 231*a*, 241*a*, 212*a*, 222*a*, 232*a*, 242*a* for connecting to those fascial connections that are tendon-relating, i.e. the muscle connectors 32, and a core-related part 211*b*, 221*b*, 231*b*, 241*b*, 212*b*, 222*b*, 232*b*, 242*b* for receiving the respective ends of the respective muscle cores.

In general, a tendon 211, 221, 231, 241, 212, 222, 232, 242 may be an endpoint for one or more than one muscle cores. Furthermore, each muscle core may be actuated via an actuation connection 27, in this example, a pneumatic tube 27.

In this example, the invention advantageously provides an actuation connection 27 for each muscle core of each muscle 21, 22, 23, 24 via the tendon which is an endpoint for only a single muscle core, i.e. via the first tendon 211, 221, 231, 241, whereas the tendon at the other end of the muscle core, i.e. the second tendon 212, 222, 232, 242, may be an endpoint for more than one muscle core. This is the case for the second tendon 212 which is endpoint for the three muscle cores of the muscle 21 provided in the proximity of locations of portions of the quadriceps of the user, and for the second tendon 232 which is endpoint for the two muscle cores of the muscle 23 provided in the proximity of respective portions of each of the two joints of the gastrocnemius muscle. This has the advantage that it leads to a simpler and more robust interface between the muscle 21, 22, 23, 24 and the actuation connection 27 via the first tendon 211, 221, 231, 241 of each of the cores, whereby the first tendon 211, 221, 231, 241 may be similar or even essentially identical for each of the muscle cores of the muscles 21, 22, 23, 24. Furthermore, in this example, the muscles and muscle cores are advantageously arranged such that the muscle core endpoint where the actuation connection 27 connects to the muscle is also the muscle core endpoint closest to the control module 4, thereby minimizing the total length of actuation connection 27 required to connect each of the muscles 21, 22, 23, 24 to the control module 4. In this way, an arrangement is provided which leads to a simple and robust connection between the muscles 21, 22, 23, 24 and control unit 4 via the actuation connection 27, which moreover minimizes the length of the actuation connection 27 extending between control unit 4 and the muscles 21, 22, 23, 24.

In this example, the actuation means is based on fluid power, using a fluid under pressure to generate, control and transmit actuation power from the control unit 4 via the actuation connection 27 to the muscles 21, 22, 23, 24; however other actuation means may also be considered instead of or in addition to fluid power. Particularly, in this example, pneumatics are considered, with the fluid preferably being air as this fluid is non-toxic to the user. The muscles 21, 22, 23, 24 are adapted to fulfil the requirement of undergoing a change in length under influence of air flow, thereby causing the respective tendons 211, 221, 231, 241, 212, 222, 232, 242 at their respective endpoints to either move towards each other when air pressure of air flowing in via the actuation connections 27 is increased, and/or to move away from each other when the airflow is reduced or stopped. A detailed description of a possible embodiment of such muscle is provided in Example 2; however, any other muscle fulfilling said requirement may be suitable.

Apart from the actuation provided by the control unit 4 and the muscles 21, 22, 23, 24, the exoskeleton 1 of this example is also provided with signal transferral through the control unit 4 and the signal modules 61, 62 and 63.

The signal transferral of the present invention is provided by said plurality of signal modules 61, 62, 63 connected to the signal connectors 42 of said control module 4 via the signal connections 67. Each of the signal modules is positioned so as to contact the user when using the exoskeleton 1. Each of the signal modules 61, 62, 63 are provided in pairs that are provided on both lateral sides of the user essentially symmetrically. The signal modules are positioned with respect to and supported by the fascial network and the anchor elements 51, 52, 53 as follows. One pair of signal modules 61 is provided on opposite lateral sides near the hip of the user and is supported at least in part by the waist band 51 to which it is attached. Another pair of signal modules 61 is provided on opposite lateral sides near the knees of the user and is supported by portions of the fascial network in close proximity of the patella 52. A third pair of signal modules 61 is provided on opposite lateral sides near the ankles of the user and is supported by portions of the fascial network in proximity of the "shoe" 53, i.e. an (air)sole of a shoe. Hereby, the (air)sole of the shoe may provide information to the signal module relating to weight lifted, lost or gained. Each of these locations is chosen so as to be structurally supported by the (physical) skeleton of the user. Also, the proximity of the anchor elements 51, 52, 53 to each of the respective signal modules 61, 62, 63 allows for a more stable positioning of the signal modules 61, 62, 63 with respect to the user. Furthermore, the locations are such that a vibration or stimulus that is generated by the signal module 61, 62, 63 at a given frequency, e.g. 128 Hz, 256 Hz or 512 Hz is generated at a zone of the user's body sensitive to such vibrations, through the specific mechanoreceptors known for this end, e.g., Meissner's corpuscles, Pacinian corpuscles, Ruffini endings and the end-bulbs of Krause relating to mechanoreception and other essential components to ensure optimal proprioception. The example of the patella region is not limitative, but is applied also in other regions of the body, for example the retimaculum extensorum and flexorum of the ankle and wrist.

The signal modules 61, 62, 63 preferably comprise one or more sensors and/or stimuli generators. In embodiments with a plurality of signal modules, the signal modules are preferably positioned with respect to the fascial network according to a chain, as illustrated in the figure, leading to a reduced total length of wiring to connect the signal modules to the control unit. The signal modules preferably provide all of sensor measurement, visual feedback through, e.g., one or more LEDs and haptic feedback through, e.g., vibrators, thereby enabling bidirectional proprioceptive interaction between the exoskeleton 1 and the user. The sensor measurement may relate to local pressure measurement which is measured with an electronic pressure sensor comprised in the signal module. Thereby, a pressure sensor measurement may be performed by the signal module 61, 62, 63 and sent to the control unit 4 via the respective signal connection 67 connecting the signal module to the control unit 4. Preferably the pressure measurement is processed by the control unit 4 to provide biofeedback, such as generating a suitable vibration based on the measurement. To this end, the control unit 4 preferably has access to predetermined information regarding the neurologic/proprioceptive system of the user. Preferably, the control unit 4 generates the suitable vibration based at least on both the measurement and the predetermined information regarding the neurologic/proprioceptive system of the user.

Example 2

Figure 5:
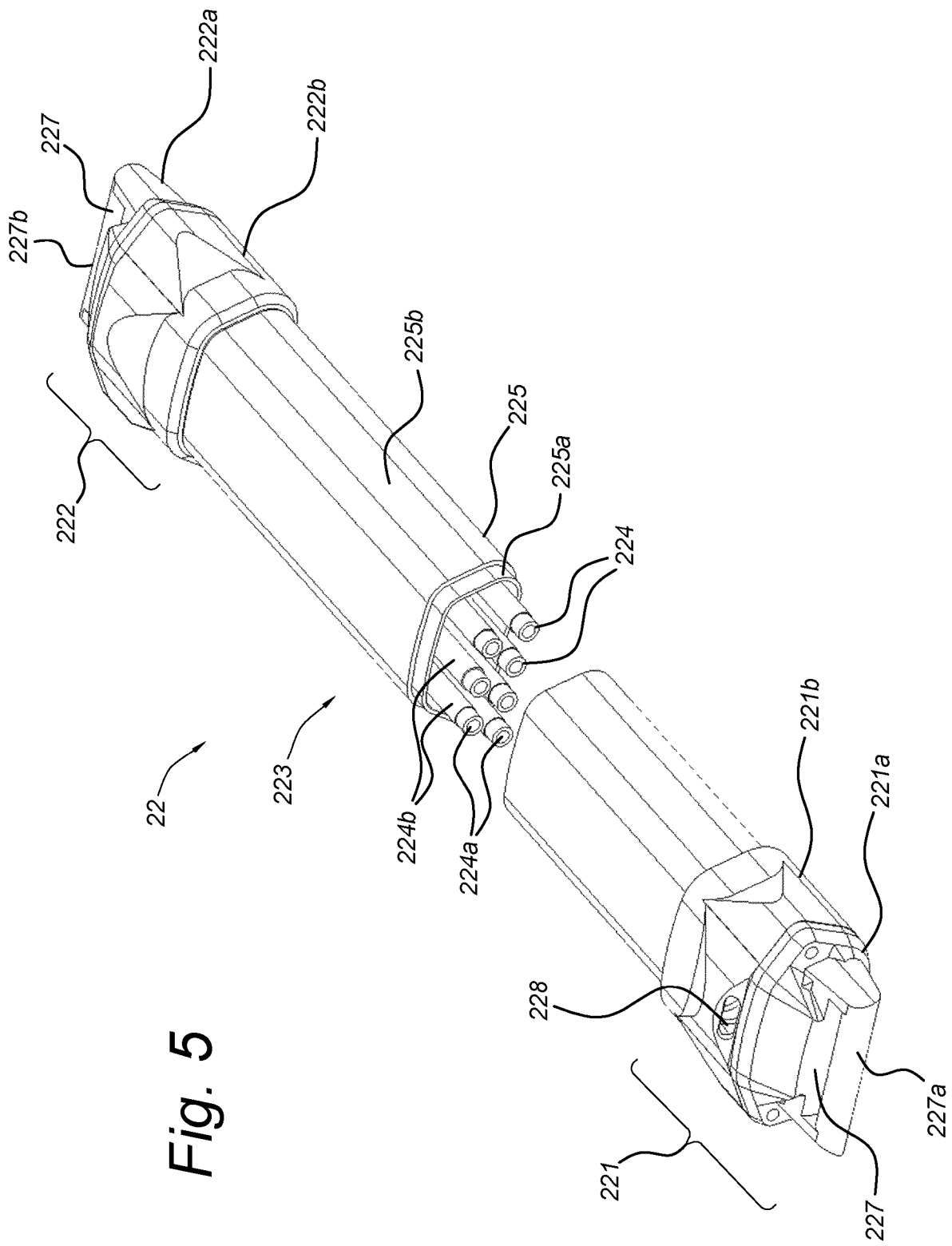
FIG. 5 is a perspective view of second example embodiments of a muscle according to the present invention.
Figure 6:
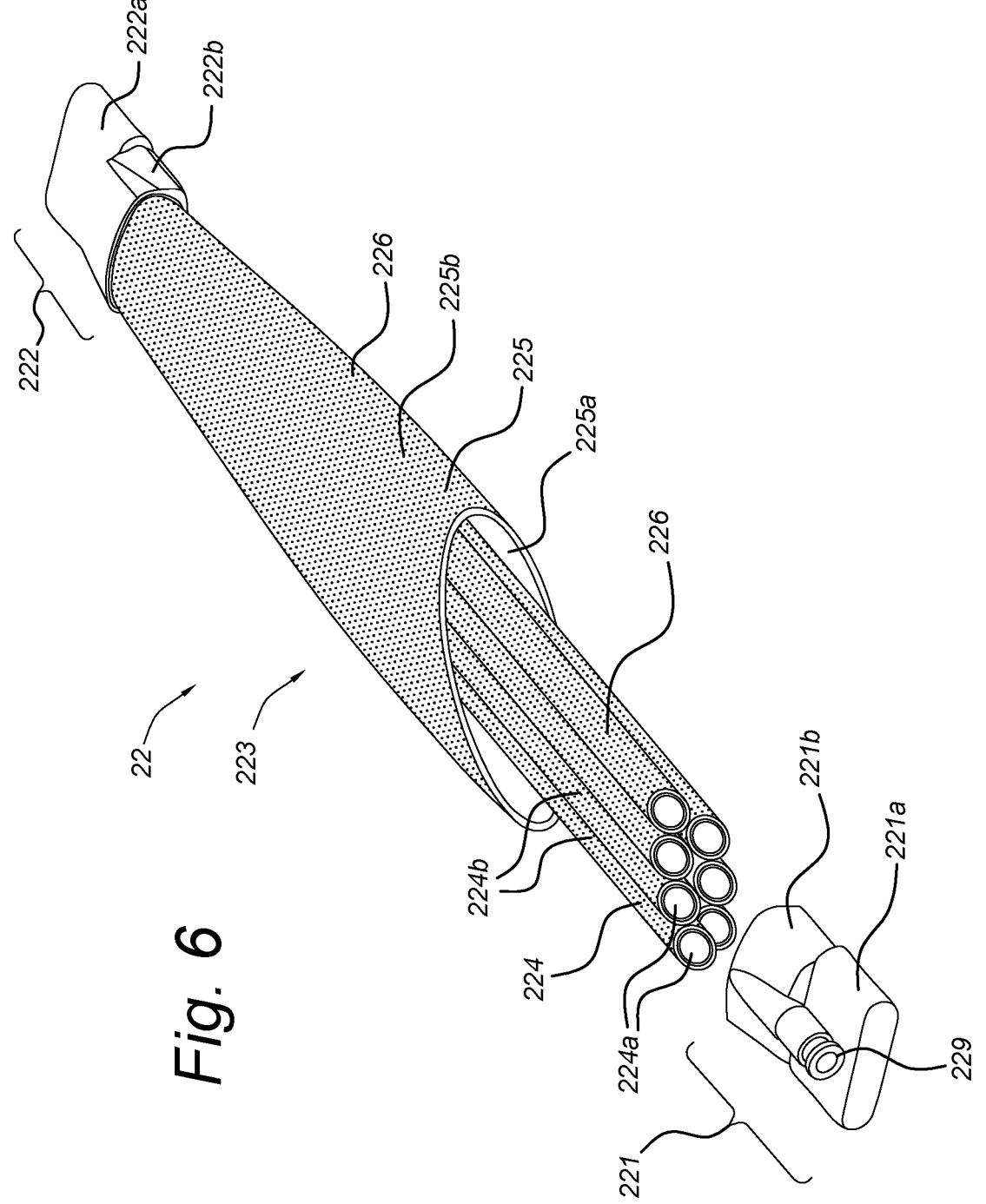
FIG. 6 is a perspective view of first example embodiments of a muscle according to the present invention.
Figure 7:
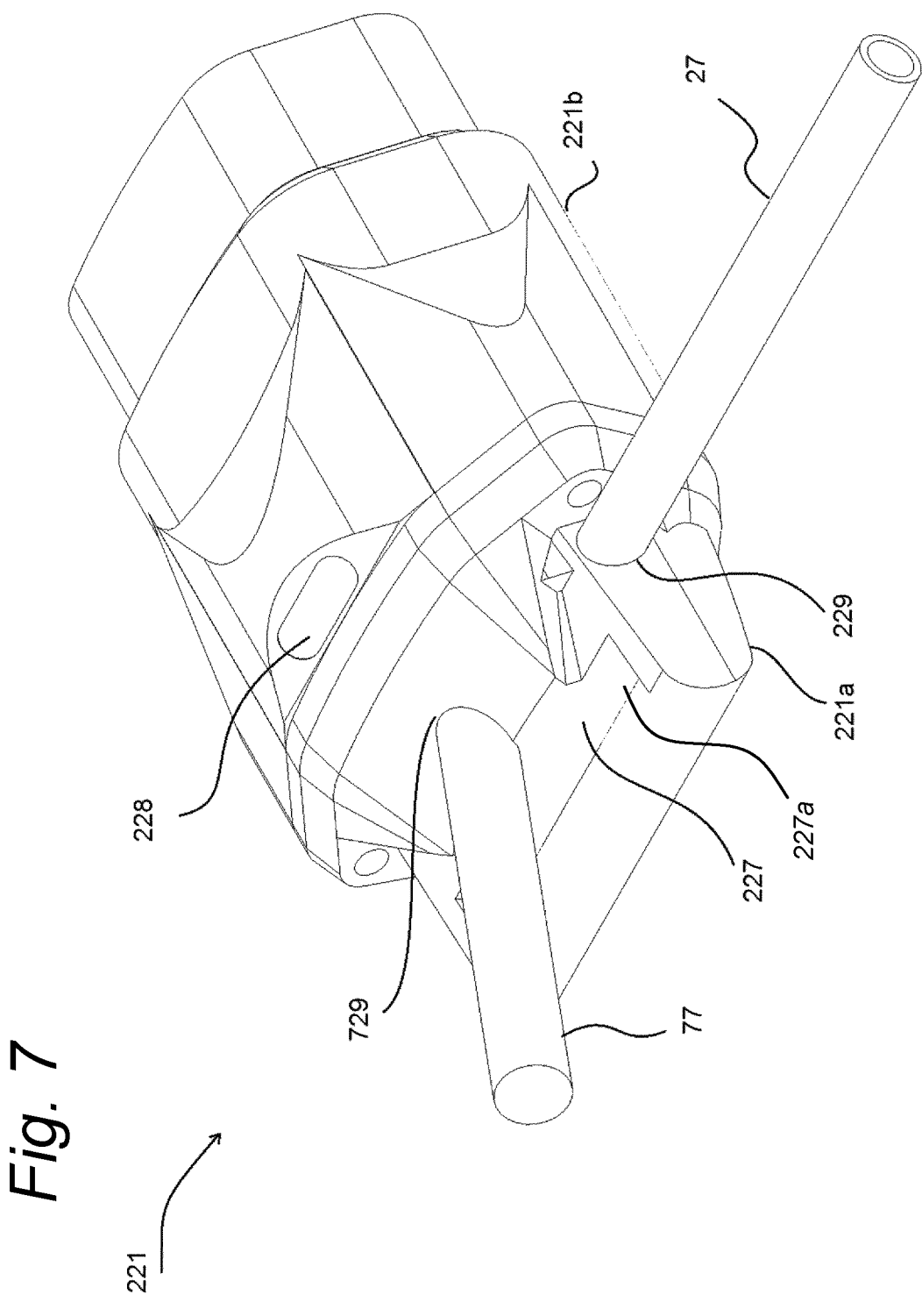
FIG. 7 is another perspective view of second example embodiments of a muscle according to the present invention.

FIG. 6 is a perspective view of first example embodiments of a muscle 22 according to the present invention. FIGS. 5 and 7 are perspective views of second example embodiments of a muscle 22 according to the present invention. Hereby, FIG. 7 is a perspective view of example tendons 221 of the muscle 22 of the invention.

The single-joint muscle 22 comprises a single elongate muscle core 223 extending between a first tendon 221, which is the first of two endpoints of the muscle 22, and the second tendon 222, which is the second of the two endpoints of the muscle 22. This example embodiment hence illustrates the case of a single-joint muscle 22 extending between a pair (221, 222) of respective first and non-shared second tendons, however the invention and the muscle 21, 22, 23, 24 according to the present invention are not limited thereto. Particularly, the muscle 22 of FIGS. 5 and 6 may preferably correspond to any of the muscles 22 or 24 of FIG. 1-3 provided in the proximity of locations of portions of the semitendinosus muscle and the biceps femoris muscle of the user. On the other hand, the invention also provides muscles 21, 23 which extend between respective first tendons 211, 231 and a respective shared single second tendon 212, 232 being endpoint for a plurality of muscle cores, as is the case, e.g., for the three muscle cores of muscle 21 provided in the proximity of locations of portions of the quadriceps of the user, and the two muscle cores of muscle 23 provided in the proximity of respective portions of each of the two joints of the gastrocnemius muscle. Hereby, a robust and simple interface is advantageously obtained by providing the interface between the muscle cores of muscles 21, 22, 23, 24 and the actuation connection 27 via a tendon from which only a single muscle core extends, i.e. the first tendon 211, 221, 231, 241.

The actuation of the muscle 23 is based on fluid power, using a fluid under pressure to generate, control and transmit actuation power from the control unit 4 via the actuation connection 27 to the muscles 21, 22, 23, 24; however other actuation means may also be considered instead of or in addition to fluid power. Particularly, in this example, pneumatics are considered, with the fluid preferably being air as this fluid is non-toxic to the user.

The muscles 21, 22, 23, 24 are adapted to undergo a change in length under influence of air flow, thereby causing the respective tendons 211, 221, 231, 241, 212, 222, 232, 242 at their respective endpoints to either move towards each other when air pressure of air flowing in via the actuation connections 27 is increased, and/or to move away from each other when the airflow is reduced or stopped. This activation or reduction can take place in a (very) fast alternating way, mimicking both eccentric, isometric and concentric muscle contraction.

The tendons comprise attachments means 227 to establish a connection to portions of the exoskeleton 1. Particularly, the first 211, 221, 231, 241 and second tendon 212, 222, 232, 242 comprise respective first 227a and second attachment means 227b. The first 227a and second 227b attachment means may be essentially the same in shape and material, but may also be different, for instance to take into account the requirements with respect to the connection of the first and second tendon to portions of the exoskeleton 1. For instance, the first attachment means 227a may be adapted for optimal connection to the hip belt 31 via complementary fascial connections 32, whereas the second attachment means 227b may be adapted for optimal connection to the patella 52 via other complementary fascial connections 32.

Each tendon comprises a fascia-related part 211a, 221a, 231a, 241a, 212a, 222a, 232a, 242a for connecting to those fascial connections that are tendon-relating, i.e. the muscle connectors 32, and a core-related part 211b, 221b, 231b, 241b, 212b, 222b, 232b, 242b for receiving the respective ends of the cores of the muscles 21, 22, 23, 24. The core-related parts may be made of any material but preferably of a shape-retaining material with limited deformation under exertion of force. The core-related parts are adapted for receiving a respective end of said muscle core in that they are provided at least with an opening for receiving said muscle core end. Moreover, they may comprise means for realizing a clamping attachment with said muscle core end. An advantage of the muscles 21, 22, 23, 24 provided by the present invention is their modular nature. Indeed, a single muscle may conveniently be taken out of the exoskeleton for reasons of maintenance, and may conveniently be replaced separately when broken. This relates to releasability and/or accessibility of attachment means 227 being provided on portions of both tendons. This additionally or alternatively relates to accessibility from the outside of the attachment means 227 being provided on portions of both tendons, preferably the fascia-related part 211a, 221a, 231a, 241a, 212a, 222a, 232a, 242a of the tendon, as well as a releasable actuation interface 229 being provided on portions of the first tendon 211, 221, 231, 241, e.g. on the core-related part 211b, 221b, 231b, 241b of the first tendon. In this example, the releasable attachment means 227 relates to a hole 227, preferably an elongate hole, suitable to receive the end of a tendon-related fascial connection 32 to establish a connection that is accessible from the outside of the exoskeleton.

The actuation interface 229 provides an interface with the actuator connection 27. For first example embodiments, illustrated by FIG. 1-3 and FIG. 6, the actuation interface 229 is provided longitudinally with respect to the muscle, i.e. the actuation interface 229 is provided on portions of the tendon provided in line with a main muscle axis extending between said tendon and the other tendon of said muscle. For second example embodiments, illustrated by FIG. 5 and FIG. 7, the actuation interface 229 (not shown on FIG. 5 but shown on FIG. 7) is provided laterally with respect to the muscle, i.e. the actuation interface 229 is provided on portions of the tendon provided laterally with respect to a main muscle axis extending between said tendon and the other tendon of said muscle.

The actuation interface 229 may preferably be a releasable actuation interface 229, such as one of the plug-and-socket type. As is clear to the skilled person, any attachment means 227 and/or actuation interface 229 that is releasable may be considered.

Preferably, also a releasable signal connection interface 729 is provided on portions of the first tendon 211, 221, 231, 241, e.g. on the core-related part 211b, 221b, 231b, 241b of the first tendon. This is not shown for the first embodiments of FIG. 6, but is shown for the second embodiments on FIG. 7. For second example embodiments, illustrated by FIG. 5 and FIG. 7, the signal connection interface 729 (not shown on FIG. 5 but shown on FIG. 7) is provided longitudinally with respect to the muscle, i.e. the signal connection interface 729 is provided on portions of the tendon provided in line with respect to a main muscle axis extending between said tendon and the other tendon of said muscle. Hereby, the signal connection interface 729 provides an interface with a signal module connection 77 for connecting the muscle 22 to one or more of the at least one signal module 61, 62, 63.

One or more of the tendons, preferably each first tendon 211, 221, 231, 241 may comprise a tendon-related visual indication means 228, preferably a LED, for indicating the status of the muscle and/or the actuation. This may relate to indicating whether the muscle is powered and/or whether the muscle is currently being actuated. In this example the tendon-related visual indication means 228 is a LED provided on the core-related part, but it may equally be provided on the fascia-related part of the tendon.

The muscle core 223, regardless of whether the second tendon 212, 222, 232, 242 is "shared" or "non-shared", may comprise a single outer sleeve 225 but preferably comprises an outer sleeve 225 extending between the first 221 and second 222 tendon and circumferentially surrounding the one or more inner sleeves 224. In this example, the muscle core 223 comprises a plurality of inner sleeves 224, particularly seven inner sleeves 224. Each of the outer sleeve 225 and the inner sleeves 224 is preferably impermeable with respect to the fluid that is used for actuation by fluid power. In this example, each of the outer sleeve 225 and the inner sleeves 224 are impermeable with respect to the fluid being air. The outer sleeve 225 comprises one or more layers, in this example an inner layer 225a and an outer layer 225b. Likewise, the inner sleeves 224 comprise one or more layers, in this example an inner layer 224a and an outer layer 224b. Each of the outer sleeve 225 and the inner sleeves 224 comprise a braided outer layer 224b, 225b comprising, owing to the braiding, a plurality of perforations 226 provided over its surface, and a flexible silicone inner layer 224a, 225a which is impermeable with respect to air. Thereby, the diameter of said perforations 226 is adapted for receiving expanded portions of said inner layer 224a, 225a within said perforations during expansion of said muscle upon said insertion of said fluid.

The inner layer 224a of the inner sleeve 224 is also referred to as inner tube. Likewise, the inner layer 225a of the outer sleeve 224 is also referred to as outer tube.

In a preferred embodiment, the plurality of perforations 226, preferably more than hundred perforations, is distributed essentially uniformly over the surface of the sleeves 224, 225, i.e. over the outer layers 224b, 225b, so as to provide even expansion and/or even tension on said inner layers 224a, 225a.

The muscle core 223, comprising at least the outer sleeve 225 and preferably also a plurality of inner sleeves 224, is made of a material that is preferably elastic so as to allow the muscle to undergo a change in length under influence of actuation, thereby causing the respective tendons 211, 221, 231, 241, 212, 222, 232, 242 at its respective endpoints to either move towards each other when actuation via the actuation connections 27 is increased, and/or to move away from each other when actuation is reduced or stopped.

As said, the muscle core 223 may comprise a single outer sleeve 225 as this is sufficient to provide an adequate means for actuation. However, preferably, the muscle core 223 comprises said outer sleeve 225 as well as a plurality of inner sleeves 224. In a preferred embodiment, the interface comprised in the first tendon 221 for inserting the fluid originating from the actuation connection 27 into the muscle 22 is provided such that the fluid is led into at least one of the outer sleeve 225 and the one or more inner sleeves 224, preferably into each of the one or more inner sleeves. A first advantage of providing a muscle core 223 comprising an outer sleeve 225 as well as a plurality of inner sleeves 224 is enhanced security, whereby the outer sleeve 225 protects the user from the individual movement of the actuated inner sleeves 224. Moreover, the user is protected by the outer sleeve 225 against impact when one of the inner sleeves 224 would break during use. Another advantage is the more homogenous distribution of actuation power delivered to the inner sleeves 224 over the surface of the muscle 22, owing to the supporting role of the outer sleeve 225. Yet another advantage is that the outer sleeve 225 allows to redistribute energy which would otherwise be "lost" after one of the inner sleeves 224 has broken, allowing an overall actuation performance of the muscle 22 which is still similar to the initial performance.

Example 3

Figure 9:
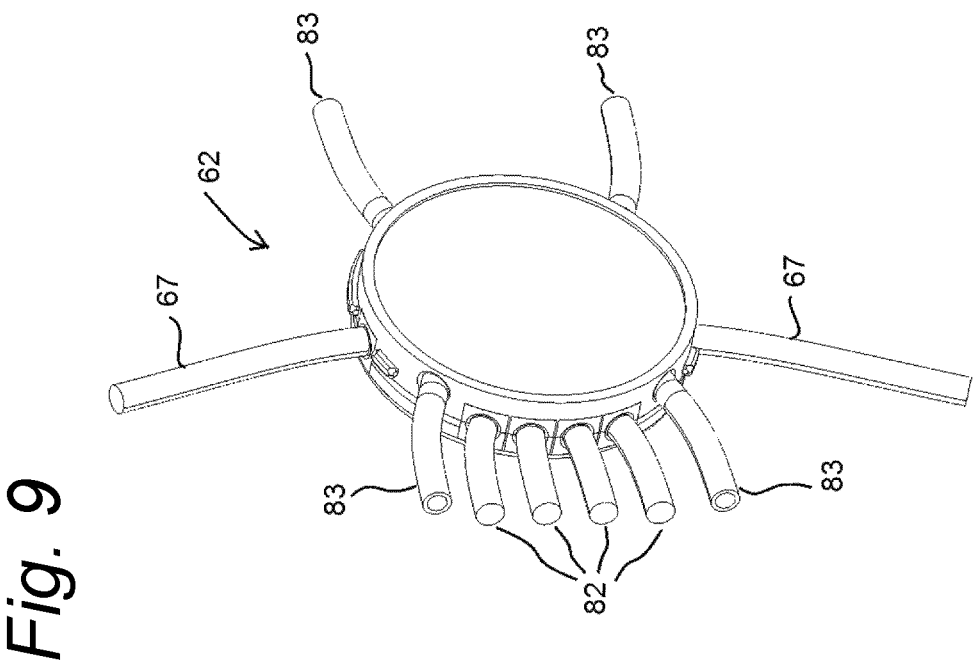
FIG. 9 is a perspective view of an example embodiment of a signal module according to the present invention.
Figure 8:
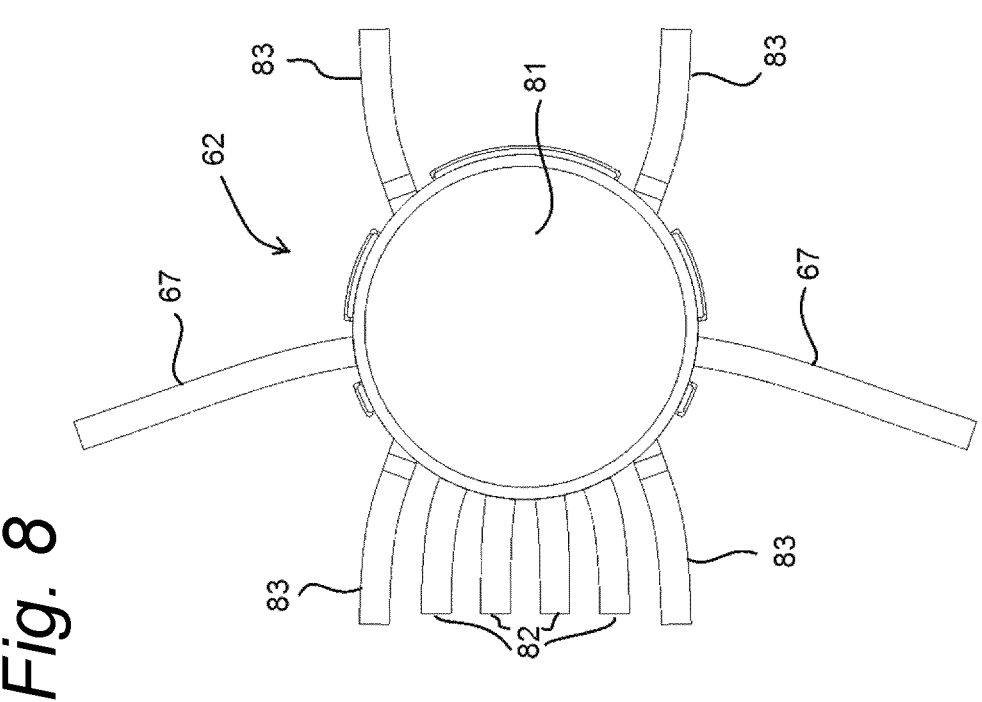
FIG. 8 is a front view of an example embodiment of a signal module according to the present invention.
Figure 10:
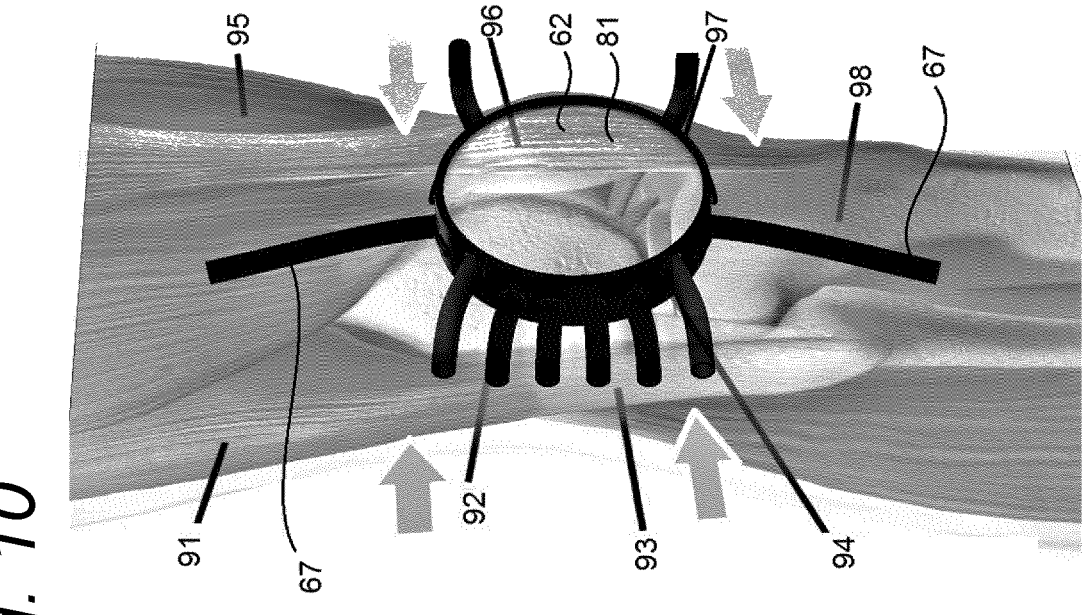
FIG. 10 is a perspective view of an example embodiment of a signal module according to the present invention when worn by a user.

FIG. 8-10 relate to an example embodiment of a signal module 62 according to the present invention. Hereby, FIG. 8 is a front view, FIG. 9 is a perspective view and FIG. 10 is a perspective view of the example embodiment of a signal module according to the present invention when worn by a user.

In the example, which may be combined with Example 4, the signal modules, also referred to as nodes, each have at least one electrical in/output from another signal module or from the backpack. There are four sensors per signal module in this example.

In this example, which may be combined with Example 4, furthermore, all muscles are connected to a signal module. Thereby, the signal module provides relaying of the data and power from and to the backpack. Thereby, some signal modules, for instance the upper and middle signal modules 61, 62, are connected to the artificial muscles.

In this example a maximum of four artificial muscles per signal module may be connected.

Summarized, the in- and outputs are as follows.

In-/outputs: electrical power+signal to artificial muscles; wiring connecting nodes and backpack.

Outputs: Visual circle shaped indication LED.

Inputs: Flexible sensors.

Particularly, the signal module 62 of the present example comprises a large visual indicator 81, particularly a circular-shaped indication LED 81 facing outwardly such that it is visible to the user. The signal module 62 provides data inputs and outputs via signal connections 67 which may be connected to further portions of the exoskeleton, preferably to signal connectors 42 of the control module 4 (not shown on FIG. 8-10).

The signal module 62, which comprises a plurality of sensors (not shown on FIG. 8-10), further provides sensor-related data transmission and/or reception via sensor-module connections 83 comprised in the signal module. The sensor-module connections 83 are not shown on FIG. 1-4 relating to Example 1 and 2 but are preferably also comprised in the exoskeleton of Example 1 and 2. The sensor-module connections 83 connect the signal module to a plurality of sensors and sensor measure points 84 (not shown on FIG. 8-10) positioned on the user.

The signal module 62 further provides muscle-related data transmission and/or reception via muscle-module connections 82. The muscle-module connections 82 are not shown on FIG. 1-4 relating to Example 1 and 2 but are preferably also comprised in the exoskeleton of Example 1 and 2. The muscle-module connections 82 connect the signal module to the plurality of artificial muscles 21, 22, 23, 24 of the exoskeleton.

FIG. 10 shows the example signal module when worn by a user at the knee. Particularly, FIG. 10 illustrates the position of the signal module 62 with respect to the hamstrings 91, femur (thigh bone) 92, ligament 93, meniscus 94, quadriceps 95, patella 96, ligament 97, and tibia 98 of the user.

While FIG. 8-10 relate to a signal module 62 worn in the proximity of the knee, signal modules 61, 63 worn at other locations may have a similar structure.

Example 4

Figure 11:
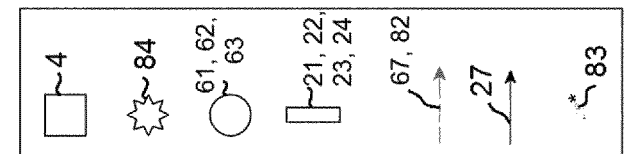
FIG. 11 illustrates an example embodiment of internal communication according to the present invention.
Figure 11:
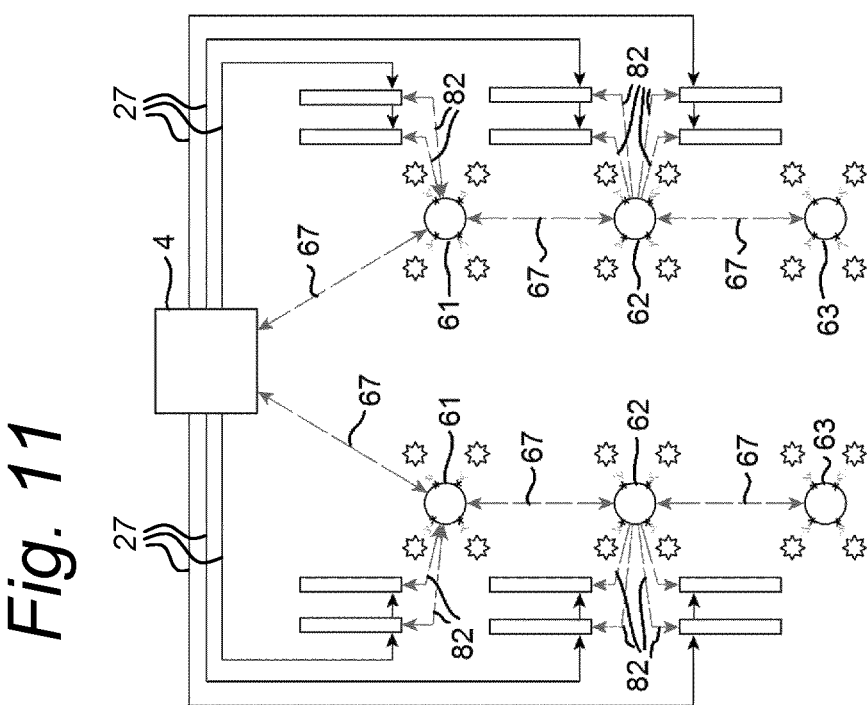

FIG. 11 illustrates an example embodiment of internal communication according to the present invention. In this example, the control unit 4, preferably being comprised in a backpack, connects to a plurality of signal modules 61, 62, 63 via signal connections 67 according to electrical connections. The control unit 4 furthermore connects to the plurality of artificial muscles 21-24 via actuation connections 27 which are pneumatic connections.

Some of the signal modules 61-62, particularly the upper and middle signal modules, are furthermore connected to the muscles 21-24 via muscle-module connections 82 according to an electrical connection, and to the sensors and sensor measure points 84 via sensor-module connections 83 according to a sensor connection, preferably an electrical connection.

In this example, the sensing of the muscle activity of the human wearer is done by specialized flexible tube sensors that are located at specific point on the wearer's body. Preferably, at least one of the sensors, more preferably at least half of the sensors, cover the tendons of the muscle groups of the human user that correspond with the muscle group of the artificial muscles. This has the advantage that the wearer can directly control the artificial muscle group with their own corresponding muscle group. For instance, a user contracting their biological quadriceps will cause the artificial quadriceps to contract at the same moment.

Example 5

Figure 12:
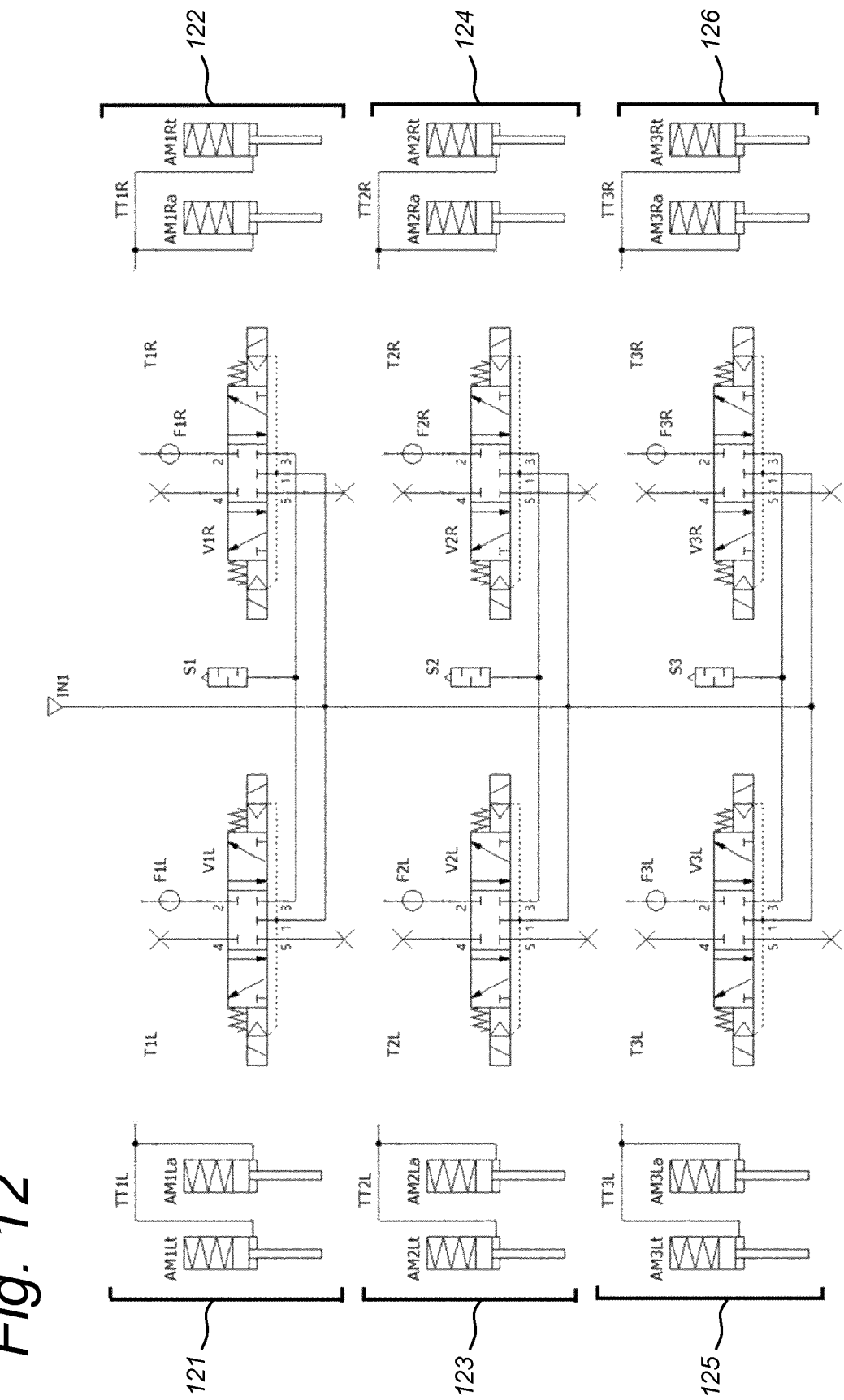
FIG. 12 illustrates an example embodiment of a pneumatic energy system according to the present invention.

FIG. 12 illustrates an example embodiment of a pneumatic energy system according to the present invention.

Two artificial muscles, corresponding to reference numerals structured AMxxx, make up for a muscle group. This may relate to the quadriceps left 121 and right 122, the gluteus left 123 and right 124, and the posterior left 125 and right 126. Each muscle group is connected with one valve, corresponding to reference numerals structured Vxx.

In embodiments, a valve may be provided either for each muscle group or for each artificial muscle, or according to a hybrid configuration, e.g. with some artificial muscles having one dedicated valve while other muscles having one valve associated with the muscle group to which they belong.

The silencers, corresponding to reference numerals structured Sx, provide for the release air to be sound damped.

The pneumatic input, corresponding to reference numerals structured Inx, provides an input for compressed air, that powers the whole pneumatic system.

In this example, all components displayed in FIG. 12 are comprised in the backpack, preferably as part of the control unit 4, except for the artificial muscles, corresponding to reference numerals structured AMxxx, and the tubes, corresponding to reference numerals structured Txx and TTxx.

The invention claimed is:

1. An artificial muscle for a soft exoskeleton, the artificial muscle comprising:
   a first tendon and a second tendon, each of the first tendon and the second tendon comprising an attachment means for attachment of said artificial muscle to a muscle connector of the exoskeleton;
   a muscle core made of a deformable material extending between said first tendon and said second tendon, the muscle core comprising an outer sleeve;
   wherein each of said first and said second tendon is adapted for receiving a respective end of said muscle core; wherein said artificial muscle comprises means for connection of said muscle core to an actuator for generating an actuation; wherein said muscle core is adapted to undergo a change in length when being actuated, thereby causing said first and said second tendon to move towards each other when said actuation is on or increased, and to move away from each other when said actuation is off or reduced;
   wherein said muscle core further comprises one or more inner sleeves extending between said first and second tendons; and wherein said outer sleeve extending between said first and second tendons circumferentially surrounds the one or more inner sleeves, and
   wherein said one or more inner sleeves is at least two inner sleeves.

2. The artificial muscle according to claim 1, wherein each of said first tendon and said second tendon comprises attachment means for connection to respective portions of an exoskeleton, wherein said attachment means of at least one of said first and said second tendon are releasable attachment means for allowing the respective one of said first and said second tendon to be inserted and/or removed individually from said exoskeleton and/or are adjustable attachment means for allowing the muscle to be tightened with respect to the exoskeleton.

3. The artificial muscle according to claim 2, wherein the attachment means of each of said first and said second tendon are releasable attachment means for allowing said artificial muscle to be inserted and/or removed from said exoskeleton, and/or said means for connection to said actuator is an actuation interface comprised in said first tendon being a releasable actuation interface for allowing at least said first tendon to be inserted and/or removed from the soft exoskeleton.

4. The artificial muscle according to claim 3, wherein said means for connection to said actuator is an actuation interface comprised in said first tendon being a releasable actuation interface for allowing at least the artificial muscle to be inserted and/or removed from the soft exoskeleton.

5. The artificial muscle according to claim 1, wherein the outer sleeve comprising
   an outer layer comprising a plurality of perforations provided over its surface, and
   a flexible inner layer;

wherein a diameter of said perforations is adapted for receiving expanded portions of said inner layer within said perforations during expansion of said muscle due to said actuation.

6. The artificial muscle according to claim 5, wherein said outer layer is a braided outer layer.

7. The artificial muscle according to claim 5, wherein said flexible inner layer is a silicone inner layer.

8. The artificial muscle according to claim 5, wherein the diameter of said perforations is adapted for receiving expanded portions of said inner layer within said perforations during expansion of said muscle upon insertion of a fluid on which actuation is based.

9. The artificial muscle according to claim 1, wherein at least one of said at least two inner sleeves comprises:

an outer layer comprising a plurality of perforations provided over its surface, and a flexible inner layer;

wherein a diameter of said perforations is adapted for receiving expanded portions of said inner layer within said perforations during expansion.

10. The artificial muscle according to claim 9, wherein said outer layer is a braided outer layer.

11. The artificial muscle according to claim 9, wherein said flexible inner layer is a silicone inner layer.

12. The artificial muscle according to claim 9, wherein said flexible inner layer is impermeable with respect to a fluid.

13. The artificial muscle according to claim 9, wherein the diameter of said perforations is adapted for receiving expanded portions of said inner layer within said perforations during expansion of said muscle upon insertion of a fluid on which actuation is based.

14. A soft exoskeleton comprising at least one artificial muscle according to claim 1; and a control unit comprising an actuator for generating an actuation for said at least one artificial muscle.

15. The soft exoskeleton according to claim 14, wherein each of said first and said second tendon is adapted for receiving a respective end of a muscle core; and wherein, of said first tendon and said second tendon, it is said first tendon that is located closest to said control unit, said first tendon comprising an actuation interface for connection of said muscle core to said control unit.

16. The soft exoskeleton of claim 14, further comprising a fascial network comprising a plurality of fascial connections for supporting the at least one muscle, the plurality of fascial connections comprising:

a plurality of muscle connectors connecting the at least one muscle via the first and second tendons to further portions of the fascial network, and a plurality of complementary fascial connections, of which at least one is adapted for providing tightening with respect to a user when using the exoskeleton and for supporting the plurality of muscle connectors.

17. The soft exoskeleton of claim 16, wherein said first tendon comprises an actuation interface for connection of the first tendon to said control unit, wherein the exoskeleton comprises an actuation connection for connecting said actuation interface of said muscle core to said control unit supported by at least one of said plurality of complementary fascial connections.

18. The soft exoskeleton according to claim 16, wherein which at least one of the plurality of complementary fascial connections is adapted for providing releasable tightening with respect to the user when using the exoskeleton and for supporting the plurality of muscle connectors.

19. The soft exoskeleton of claim 14, wherein said exoskeleton comprises an anchor element, said anchor element being any of a waist band, an artificial patella or a shoe and/or wherein said one or more muscles comprise at least two muscles forming an agonist-antagonist pair, wherein said control unit is configured to reduce and/or stop the actuation of one of said agonist-antagonist pair when the actuation of the other one of said agonist-antagonist pair is started and/or increased.

20. The soft exoskeleton of claim 16, wherein said exoskeleton relates to lower limbs, wherein said plurality of complementary fascial connections comprises a hip belt adapted for providing releasable tightening with respect to the user when using the exoskeleton and for supporting the plurality of muscle connectors, wherein said exoskeleton further comprises an anchor element being a waist band tightened to the user by said hip belt, and wherein said control unit is supported by said waist band.

21. The soft exoskeleton of claim 14, wherein said exoskeleton operates according to a passive or an active mode, wherein said active mode relates to at least one of said at least one artificial muscle being actuated to an active level of actuation and wherein said passive mode relates to said at least one artificial muscle being actuated to a passive level of actuation, wherein said active level of actuation is higher than said passive level of actuation, and wherein the control unit is configured to detect at least one of a user-movement-based activation trigger for switching from the passive mode to the active mode, and a user-movement-based deactivation trigger for switching from the active mode to the passive mode.

22. The soft exoskeleton according to claim 21, wherein said active level of actuation corresponds to full actuation and/or wherein said passive level of actuation corresponds to no actuation.

23. The soft exoskeleton of claim 14 comprising at least one signal module connected to said control unit; wherein the signal module comprises at least one of: a stimuli generator configured for generating stimuli for transfer to a user and/or an environment of the user; and a sensor located in the vicinity of the user and configured for measuring measurement data relating to the user and/or the environment of the user.

24. The soft exoskeleton of claim 23, wherein at least part of signal module is comprised in at least one of: a fascial network, at least one tendon or the muscle core of at least one artificial muscle, and/or the control unit.

25. The soft exoskeleton of claim 24, wherein said control unit is configured for generating, based on stimuli-related data, an instruction for stimuli; and transmitting, to said signal module, said instruction for stimuli; and wherein said stimuli generator is configured for generating said stimuli based on said instruction for stimuli.

26. The soft exoskeleton of claim 23, wherein the signal module comprises a sensor located in the vicinity of the user; wherein said at least one signal module is configured for:

measuring, via said sensor, measurement data;

transmitting said measurement data to the control unit;

preferably, receiving an instruction for stimuli from the control unit;

preferably, generating, via said stimuli generator and based on said instruction for stimuli, stimuli, for transfer to the user for providing biofeedback;

and wherein said control unit is configured for:

receiving, from said at least one signal module, said measurement data;

generating, based on a level of said actuation and based on said measurement data, at least one of an instruction for stimuli for providing biofeedback, or a new value for said level of said actuation, respectively;

transmitting, to said signal module, said instruction for stimuli and/or controlling said actuator for generating said actuator for generating said actuation based on said new value, respectively.

27. The soft exoskeleton of claim 26, wherein said generating comprises generating each of said instruction for stimuli for providing biofeedback for said stimuli generator comprised in said signal module and said new value for said level of said actuation; and wherein said control unit is configured for performing each of transmitting, by said control unit and to said signal module, said instruction for stimuli; and generating, by said stimuli generator and based on said instruction for stimuli, said stimuli, for transfer to the user for providing biofeedback; and controlling said actuator for generating said actuation based on said new value for providing biofeedback.

28. The soft exoskeleton according to claim 27, wherein said stimuli are vibrations.

29. The soft exoskeleton according to claim 26, wherein said measurement data is a pressure measurement originating from the user wearing said exoskeleton.

30. The soft exoskeleton according to claim 26, wherein said at least one signal module is additionally configured for:

receiving an instruction for stimuli from said control unit; and/or generating, via said stimuli generator and based on said instruction for stimuli, wherein said stimuli are vibrations for transfer to the user for providing biofeedback.

31. The soft exoskeleton according to claim 23, wherein said stimuli are vibrations and/or light radiation.

32. The exoskeleton according to claim 14, comprising a fascial network, the fascial network comprising a plurality connection for supporting at least one of artificial muscles.

33. The artificial muscle according to claim 1, wherein said means for connection to said actuator is an actuation interface comprised in the first tendon.

* * * * *